US007921408B2

(12) United States Patent
Shenfield et al.

(10) Patent No.: US 7,921,408 B2
(45) Date of Patent: *Apr. 5, 2011

(54) SYSTEM AND METHOD FOR APPLYING DEVELOPMENT PATTERNS FOR COMPONENT BASED APPLICATIONS

(75) Inventors: Michael Shenfield, Richmond Hill (CA); Bryan Richard Goring, Wellesley (CA); Daniel Mateescu, Woodbridge (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/633,155

(22) Filed: Dec. 8, 2009

(65) Prior Publication Data

US 2010/0199261 A1 Aug. 5, 2010

Related U.S. Application Data

(63) Continuation of application No. 11/078,430, filed on Mar. 14, 2005, now Pat. No. 7,657,868.

(51) Int. Cl.
*G06F 9/44* (2006.01)
(52) U.S. Cl. ........ 717/107; 717/109; 717/121; 715/763; 715/764
(58) Field of Classification Search .......... 717/107–109, 717/116, 121–122; 715/763, 764
See application file for complete search history.

(56) References Cited

U.S. PATENT DOCUMENTS

| | | | | |
|---|---|---|---|---|
| 6,104,874 A * | 8/2000 | Branson et al. | ............... | 717/108 |
| 6,226,788 B1 * | 5/2001 | Schoening et al. | ........... | 717/107 |
| 6,993,743 B2 * | 1/2006 | Crupi et al. | ................... | 717/102 |
| 7,000,219 B2 * | 2/2006 | Barrett et al. | ................. | 717/107 |
| 7,047,518 B2 * | 5/2006 | Little et al. | .................... | 717/108 |
| 7,178,129 B2 * | 2/2007 | Katz | .............................. | 717/108 |
| 7,219,327 B1 * | 5/2007 | Jacobs et al. | .................. | 717/104 |
| 7,266,806 B2 * | 9/2007 | Choi et al. | .................... | 717/108 |

(Continued)

FOREIGN PATENT DOCUMENTS

WO WO 98/30962 7/1998

(Continued)

OTHER PUBLICATIONS

European Search Report issued by the European Patent Office dated Sep. 6, 2005 for corresponding European Patent Application No. 05101956.
European Search Report issued by the European Patent Office dated Nov. 5, 2005 for corresponding European Patent Application No. 05101955.2.

(Continued)

*Primary Examiner* — Wei Y Zhen
*Assistant Examiner* — Satish Rampuria
(74) *Attorney, Agent, or Firm* — Gowling Lafleur Henderson LLP

(57) ABSTRACT

A computing device and method for coordinating the development of a client application including application components comprising one or more of at least one of a data component, a message component or a screen component, having corresponding component definitions, or a workflow component comprising a series of instructions. A first development pattern module configured for interaction with a development environment is provided by a computer user interface, the first development pattern module configured for selecting a first pattern from a plurality of patterns based on an application component type central to the client application, the first development pattern module for guiding a user interface with a plurality of predefined steps to coordinate a development of the application components through user input events via the user interface in accordance with the first pattern.

19 Claims, 18 Drawing Sheets

U.S. PATENT DOCUMENTS

| | | | |
|---|---|---|---|
| 7,272,819 B2 | 9/2007 | Seto et al. | |
| 7,296,263 B1 | 11/2007 | Jacob | |
| 7,493,594 B2 | 2/2009 | Shenfield et al. | |
| 2002/0026474 A1 | 2/2002 | Wang et al. | |
| 2002/0073396 A1 | 6/2002 | Crupi et al. | |
| 2004/0003400 A1 | 1/2004 | Carney et al. | |
| 2004/0172555 A1* | 9/2004 | Beringer et al. | 713/201 |
| 2004/0177335 A1* | 9/2004 | Beisiegel et al. | 717/102 |
| 2005/0257190 A1* | 11/2005 | Shaburov et al. | 717/106 |
| 2006/0206861 A1* | 9/2006 | Shenfield et al. | 717/106 |
| 2006/0206890 A1* | 9/2006 | Shenfield et al. | 717/174 |

FOREIGN PATENT DOCUMENTS

| | | |
|---|---|---|
| WO | WO 01/46802 * | 6/2001 |
| WO | WO01/46802 A2 | 6/2001 |
| WO | WO 2004/059938 | 7/2004 |

OTHER PUBLICATIONS

Xiulan, Yu et al., "WSCE: a flexible web service composition environment" XP010708875, the whole document.

European Search Report issued by the European Patent Office dated Aug. 29, 2005 for corresponding European Patent Application No. 05101890.1.

Tatsubori, M et al., "Best-practice patterns and tool support for configuring secure web services messaging" XP010708861, the whole document.

International Search Report, Application No. EP 05 10 1958, dated Aug. 19, 2005; Deploying BlackBerry Desktop and Handheld Software 2003, XP002288590, p. 3, line 24-p. 6, line 2.

Abrams M. et al.; "UIML: an applicance-independent XML user interface language" Computer Networks, Elsevier Science Publishers B.V., Amsterdam, NL, vol. 31, No. 11-16, May 17, 1999, pp. 1695-1708, XP004304584 ISSN: 1389-1286 *abstract* *p. 1699, left-hand column, line 22-p. 1701, right-hand column, last line.

* cited by examiner

SYSTEM AND METHOD FOR APPLYING DEVELOPMENT PATTERNS FOR COMPONENT BASED APPLICATIONS

CROSS-REFERENCE TO RELATED APPLICATIONS

This application is a continuation of application Ser. No. 11/078,430, filed on Mar. 14, 2005, and now U.S. Pat. No. 7,657,868 on Sep. 14, 2009, the entire disclosure of which is hereby incorporated by reference for all purposes.

REFERENCE TO A COMPUTER PROGRAM LISTING APPENDIX

A computer program listing appendix is filed herewith submitted on a single compact disc (Copy 1) and a duplicate copy (Copy 2) of the compact disk. The contents of the compact disk, and its duplicate copy, include five (5) ASCII files entitled, "11078430_1.txt", "11078430_2.txt", "11078430_3.txt", "11078430_4.txt", and "11078430_5.txt". The contents of this computer program listing appendix, filed on compact disk, are incorporated herein by reference.

BACKGROUND

This application relates generally to development of component based applications and their availability over a network.

There is a continually increasing number of terminals and mobile devices in use today, such as smart phones, PDAs with wireless communication capabilities, personal computers, self service kiosks and two-way pagers/communication devices. Software applications which run on these devices increase their utility. For example, a smart phone may include an application which retrieves the weather for a range of cities, or a PDA may include an application that allows a user to shop for groceries. These software applications take advantage of the connectivity to a network in order to provide timely and useful services to users. However, due to the restricted resources of some devices, and the complexity of delivering large amounts of data to the devices, developing and maintaining software applications tailored for a variety of devices remains a difficult and time-consuming task.

Currently, mobile communication devices are configured to communicate with Web Services through Internet based Browsers and/or native applications. Browsers have the advantage of being adaptable to operate on a cross-platform basis for a variety of different devices, but have a disadvantage of requesting pages (screen definitions in HTML) from the Web Service, which hinders the persistence of data contained in the screens. A further disadvantage of Browsers is that the screens are rendered at runtime, which can be resource intensive. Native applications have the advantage of being developed specifically for the type of mobile device, thereby providing a relatively optimized application program for each runtime environment. However, native applications have a disadvantage of not being platform independent, thereby necessitating the development of multiple versions of the same application, as well as being relatively large in size, thereby taxing the memory resources of the mobile device. Further, application developers need experience with programming languages such as Java™ and C++ to construct these hard coded native applications. There is a need for application development environments that can assist in the development of applications for selected devices and terminals with their respective runtime environment, as well as being capable of assisting the selection from a variety of back-end data sources.

Systems and methods disclosed herein provide a component based application development environment to obviate or mitigate at least some of the above presented disadvantages.

SUMMARY

Current software applications take advantage of the connectivity to a network in order to provide timely and useful services to users. However, due to the restricted resources of some devices, and the complexity of delivering large amounts of data to the devices, developing and maintaining software applications tailored for a variety of devices remains a difficult and time-consuming task. Current application generation environments are not based on component application architecture, which facilitates generation of an application for running on clients having a wide variety of runtime environments. Native applications are an example of current applications which have disadvantages of not being platform independent, thereby necessitating the development and subsequent generation of multiple versions of the same application, as well as being relatively large in size, thereby taxing the memory resources of the mobile device.

Contrary to current application generation environments a system and method is provided for coordinating the development of an application including a first component having definitions expressed in a structured definition language and a second component having a series of instructions. The components define the processing on a device runtime environment of messages communicated over a network between the device and a datasource. The system and method comprise a first development pattern configured for interaction with a development environment provided by a computer user interface, the first pattern for guiding a user of the user interface with a plurality of predefined steps to coordinate the development of the application components through user input events via the user interface The first pattern is configured for selecting from a plurality of patterns based on a component type central to the first development pattern such that the component type is selected from a plurality of types including at least one of data, message, screen, and workflow. The system and method also include a first module corresponding to the selected component type and configured for coupling to the first pattern. The first module is for developing the definitions of at least one of the components through interaction with a data model of the development environment providing a persistent state of the application. The operation of the first module is coordinated using the plurality of the predefined steps communicated to the user through the user interface; wherein the developed components are subsequently assembled as the application.

Accordingly, a system is provided for coordinating the development of an application including a first component having definitions expressed in a structured definition language and a second component having a series of instructions, the components for defining the processing on a device runtime environment of messages communicated over a network between the device and a datasource, the system comprising: a first development pattern module configured for interaction with a development environment provided by a computer user interface, the first pattern for guiding a user of the user interface with a plurality of predefined steps to coordinate the development of the application components through user input events via the user interface, the first pattern configured for selecting from a plurality of patterns based on a component type central to the first development pattern, the component type for selecting from a plurality of types including at least one of data, message, screen, and workflow; and a first module corresponding to the selected component type and configured for coupling to the first pattern, the first module for developing the definitions of at least one of the components through interaction with a data model of the development environment providing a persistent state of the application, the operation of the first module being coordinated using the plurality of the predefined steps communicated to the user through the user interface; wherein the developed components are subsequently assembled as the application.

Also disclosed is a method for coordinating the development of an application including a first component having definitions expressed in a structured definition language and a second component having a series of instructions, the components for defining the processing on a device runtime environment of messages communicated over a network between the device and a datasource, the method comprising the steps of: selecting a first development pattern module configured for interaction with a development environment provided by a computer user interface; guiding a user of the user interface through the first pattern with a plurality of predefined steps to coordinate the development of the application components through user input events via the user interface, the first pattern configured for selecting from a plurality of patterns based on a component type central to the first development pattern, the component type for selecting from a plurality of types including at least one of data, message, screen, and workflow; selecting a first module corresponding to the selected component type and configured for coupling to the first pattern; and developing by the first module the definitions of at least one of the components through interaction with a data model of the development environment providing a persistent state of the application, the operation of the first module being coordinated using the plurality of the predefined steps communicated to the user through the user interface; wherein the developed components are subsequently assembled as the application.

Also disclosed is a computer program product for coordinating the development of an application including a first component having definitions expressed in a structured definition language and a second component having a series of instructions, the components for defining the processing on a device runtime environment of messages communicated over a network between the device and a datasource, computer program product comprising: a computer readable medium; a first development pattern module stored on the computer readable medium configured for interaction with a development environment provided by a computer user interface, the first pattern for guiding a user of the user interface with a plurality of predefined steps to coordinate the development of the application components through user input events via the user interface, the first pattern configured for selecting from a plurality of patterns based on a component type central to the first development pattern, the component type for selecting from a plurality of types including at least one of data, message, screen, and workflow; and a first module stored on the computer readable medium corresponding to the selected component type and configured for coupling to the first pattern, the first module for developing the definitions of at least one of the components through interaction with a data model of the development environment providing a persistent state of the application, the operation of the first module being coordinated using the plurality of the predefined steps communicated to the user through the user interface; wherein the developed components are subsequently assembled as the application.

BRIEF DESCRIPTION OF THE DRAWINGS

These and other features will become more apparent in the following detailed description in which reference is made to the appended drawings wherein.

DESCRIPTION

Network System

Figure 1:
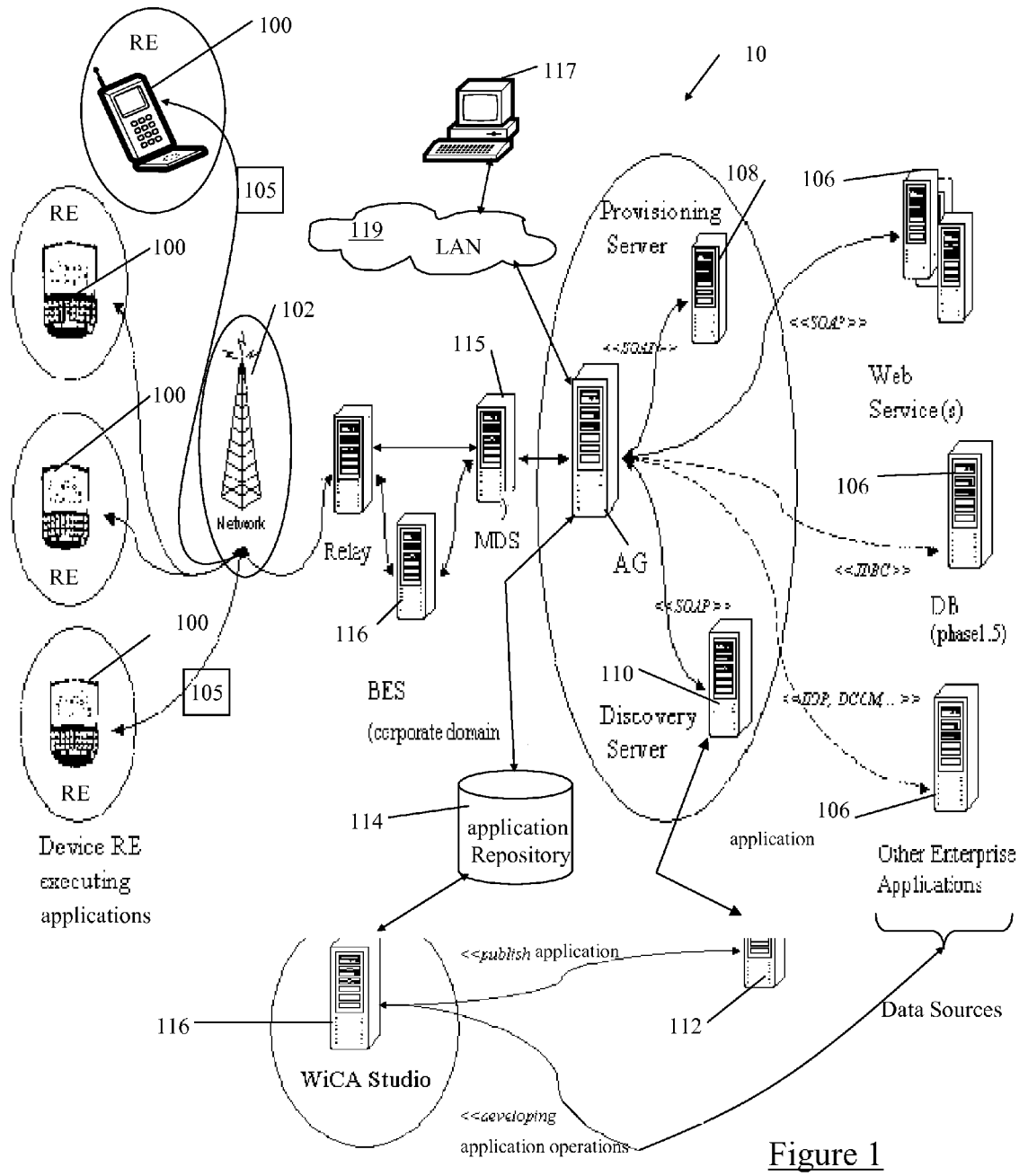
FIG. 1 is a block diagram of a communication network system.

Referring to FIG. 1, a network system 10 comprises mobile communication devices 100 for interacting with one or more backend data sources 106 (e.g. a schema based service such as web service or database that provides enterprise services used by an application 105) via a wireless network 102 coupled to an application gateway AG. The devices 100 are devices such as but not limited to mobile telephones, PDAs, two-way pagers, dual-mode communication devices. The network 10 can also have desktop computers 117 coupled though a local area network 119. The devices 100 and desktop computers 117 of the network 10 are hereafter referred to as the devices 100 for the sake of simplicity. It is recognised that the application gateway AG and data sources 106 can be linked via extranets (e.g. the Internet) and/or intranets as is known in the art. The application gateway AG handles request/response messages initiated by the application 105 as well as subscription notifications pushed to the device 100 from the data sources 106. The Application Gateway AG can function as a Data Mapping Server for mediating messaging between a client runtime RE on the device 100 and a backend server of the data sources 106. The Runtime Environment RE is an intelligent container that executes application 105 components and provides common services as needed for execution of the applications 105. The gateway AG can provide for asynchronous messaging for the applications 105 and can integrate and communicate with legacy back-end data sources 106. The devices 100 transmit and receive the Wireless Component Applications technology or wireless component applications 105, as further described below, when in communication with the data sources 106, as well as transmit/receive messaging associated with operation of the applications 105. The devices 100 can operate as web clients of the data sources 106 through execution of the applications 105 when provisioned on respective runtime environments RE of the devices 100.

For satisfying the appropriate messaging associated with the applications 105, the application gateway AG communicates with the data sources 106 through various protocols (such as but not limited to HTTP, SQL, and component API) for exposing relevant business logic (methods) to the applications 105 once provisioned on the devices 100. The applications 105 can use the business logic of the data sources 106 similarly to calling a method on an object (or a function). It is recognized that the applications 105 can be downloaded/uploaded in relation to data sources 106 via the network 102 and application gateway AG directly to the devices 100. For example, the application gateway AG is coupled to a provisioning server 108 and a discovery server 110 for providing a mechanism for optimized over-the-air provisioning of the applications 105, including capabilities for application 105 discovery from the device 100 as listed in a UDDI (for example) registry 112. The Registry 112 can be part of the Discovery Service implemented by the server 110, and the registry 112 is used for publishing the applications 105. The application 105 information in the registry 112 can contain such as but not limited to a Deployment Descriptor DD (contains information such as application 105 name, version, and description) as well as the location of this application 105 in an application repository 114.

Referring again to FIG. 1, for initialization of the runtime environment RE, the RE receives the gateway AG URL and the gateway AG public key in a MDS 115 service book. The runtime environment RE uses this information to connect to the gateway AG for initial handshaking Device 100 provisioning or BES 116, depending on the domain, pushes the MDS 115 service book to the device 100. It is recognised there could be more than one gateway AG in the network 10, as desired. Once initialized, access to the applications 105 by the devices 100, as downloaded/uploaded, can be communicated via the gateway AG directly from the application repository 114, and/or in association with data source 106 direct access (not shown) to the repository 114.

Application Design User Interface or Tool 116

Referring to FIG. 1, the applications 105 can be stored in the repository 114 as a series of packages that can be created by a Studio developer tool 116, which is employed by developers of the applications 105. The developer design tool 116 can be a RAD tool used to develop the Wired and/or Wireless Component Application 105 packages. The tool 116 can provide support for a drag- and drop graphical approach for the visual design of application 105 components (see FIG. 4) such as but not limited to screens 402, data elements 400, messages 404 and application workflow logic 406, as further defined below. The application 105 packages are represented as metadata (XML) that can be generated automatically by the tool 116 through an automatic code generation process. This tool 116 can provide for the automatic generated code to include or be otherwise augmented by an industry standard scripting language (e.g. JavaScript™) or other scripting/programming languages known in the art. The availability of the application 105 packages of the repository 114 are published via the discovery service of the server 110 in the registry 112.

It is recognized that there can be more than one repository 114 and associated registries 112 as utilized by the particular network 10 configuration of the application gateway AG and associated data sources 106.

Figure 2:
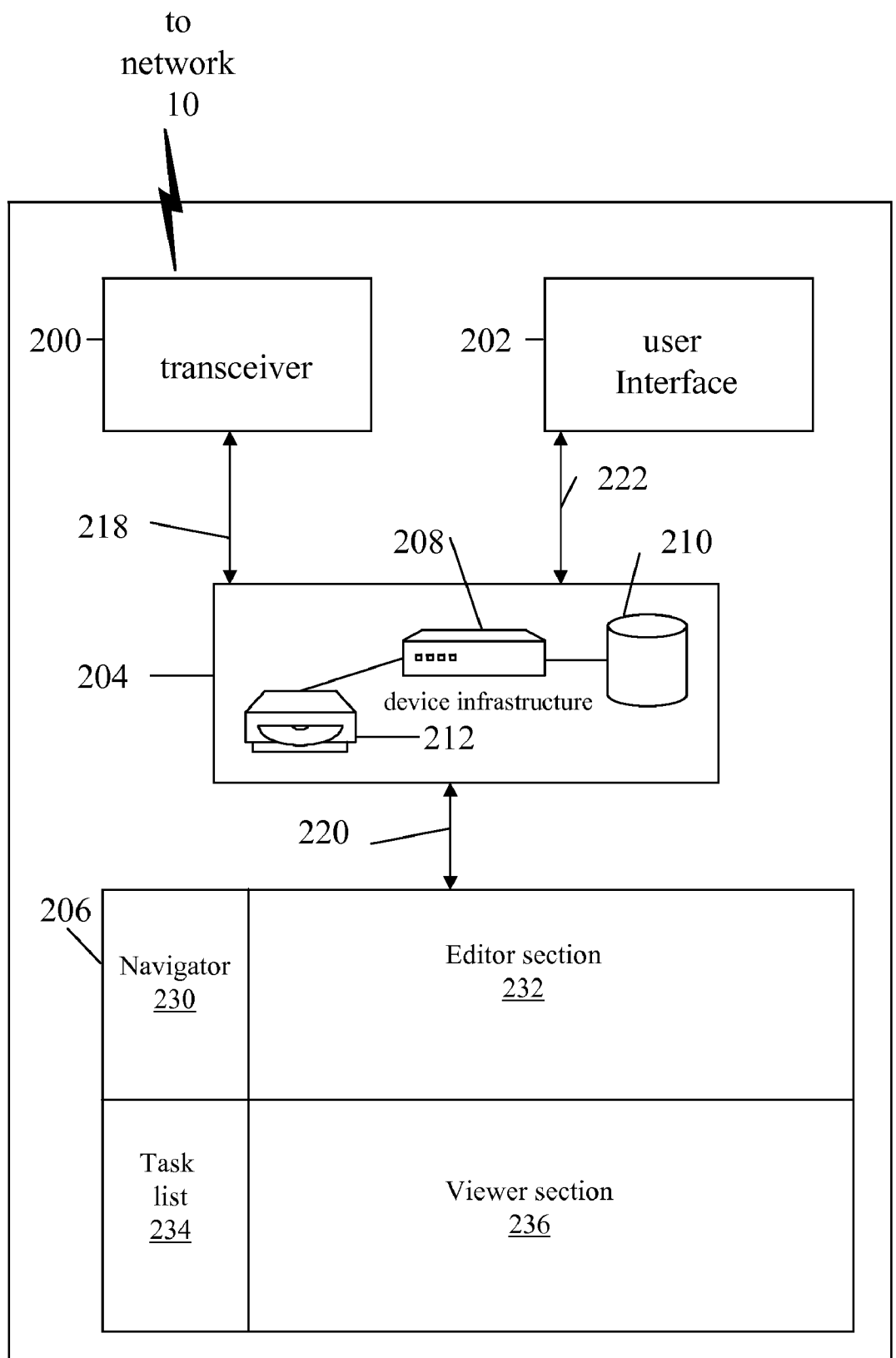
FIG. 2 is a block diagram of a tool for developing and generating the applications of FIG. 1.

Referring to FIG. 2, the tool 116 is operated on a computer 201 that can be connected to the network 10 via a network connection interface such as a transceiver 200 coupled via connection 218 to a device infrastructure 204. The transceiver 200 can be used to upload completed application programs 105 to the repository 114 (see FIG. 1), as well as access the registry 112 and selected data sources 106. Referring again to FIG. 2, the developer design tool 116 also has a user interface 202, coupled to the device infrastructure 204 by connection 222, to interact with a user (not shown). The user interface 202 includes one or more user input devices such as but not limited to a keyboard, a keypad, a trackwheel, a stylus, a mouse, a microphone, and is coupled to a user output device such as a speaker (not shown) and a screen display 206. If the display 206 is touch sensitive, then the display 206 can also be used as the user input device as controlled by the device infrastructure 204. The user interface 202 is employed by the user of the tool 116 to coordinate the design of applications 105 using a series of editors 600 and viewers 602 (see FIG. 6), using a plurality of wizards 604 to assist/drive in the workflow of the development process.

Referring again to FIG. 2, operation of the tool computer 201 is enabled by the device infrastructure 204. The device infrastructure 204 includes a computer processor 208 and the associated memory module 210. The computer processor 208 manipulates the operation of the network interface 200, the user interface 202 and the display 206 of the tool 116 by executing related instructions, which are provided by an operating system and application 105 design editors 600, wizards 604, dialogs 605 and viewers 602 resident in the memory module 210. Further, it is recognized that the device infrastructure 204 can include a computer readable storage medium 212 coupled to the processor 208 for providing instructions to the processor 208 and/or to load/design the applications 105 also resident (for example) in the memory module 210. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination.

Referring again to FIG. 2, the design tool 116 is operated on the computer 201 as an application development environment for developing the applications 105. The development methodology of the tool 116 can be based on a visual "drag and drop" system of building the application visual, data, messaging behaviour, and runtime navigation model. The tool 116 can be structured as a set of plug-ins to a generic integrated design environment (IDE) framework, such as but not limited to the Eclipse framework, or the tool 116 can be configured as a complete design framework without using plug-in architecture. For exemplary purposes only, the tool 116 will now be described as a plug-in design environment using the Eclipse framework.

Figure 6:
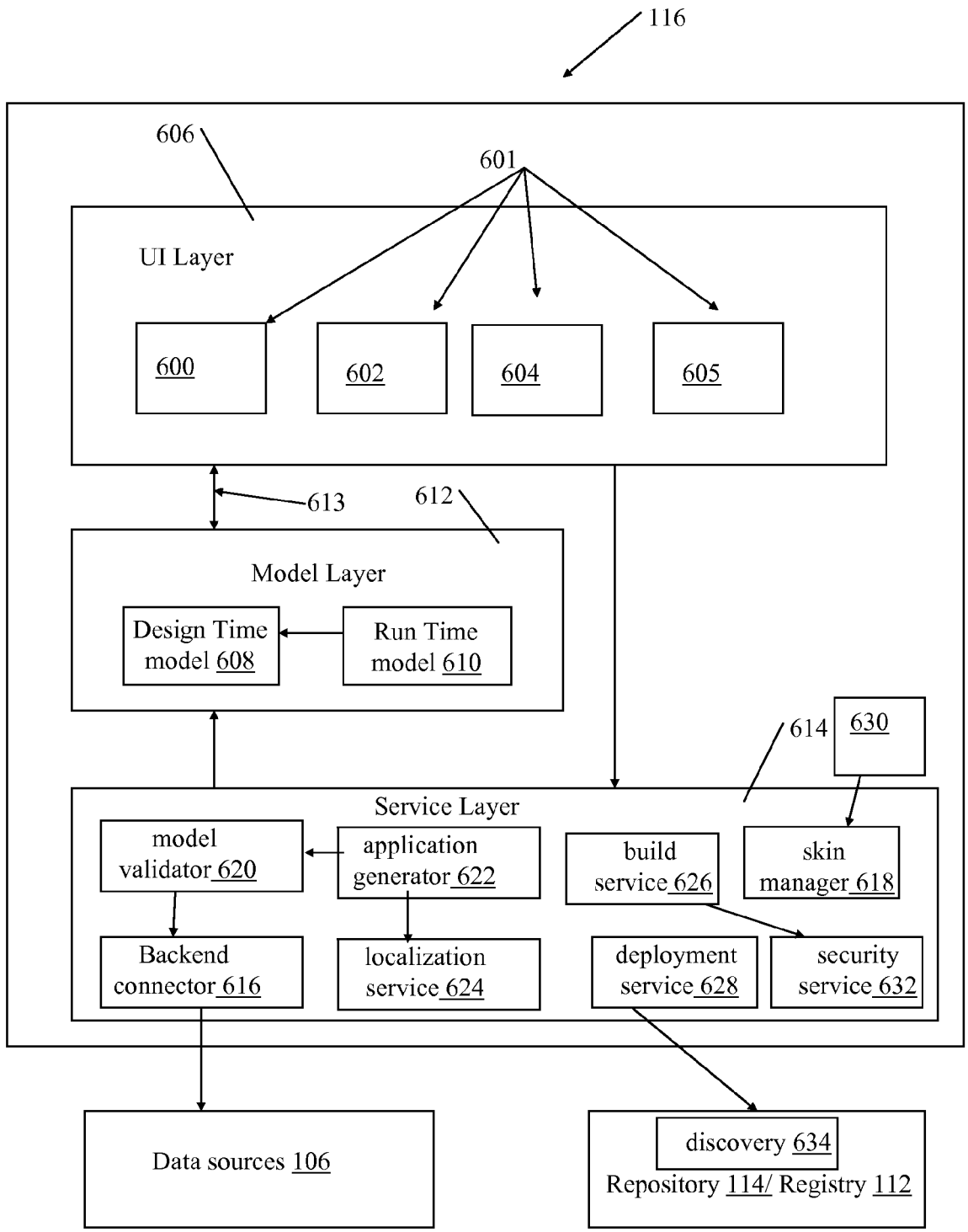
FIG. 6 is a block diagram of the tool architecture of FIG. 2.

Referring to FIGS. 2 and 6, Eclipse makes provisions for a basic, generic tool 116 environment that can be extended to provide custom editors, wizards, project management and a host of other functionality. The Eclipse Platform is designed for building integrated development environments (IDEs)

that can be used to create applications as diverse as web sites, embedded Java™ programs, C++ programs, and Enterprise JavaBeans™. The navigator view 230 shows files in a user's (e.g. developer) workspace; a text editor section 232 shows the content of a file being worked on by the user of the tool 116 to develop the application 105 and associated components 400,402,404,406 (see FIG. 4) in question; the tasks view section 234 shows a list of to-dos for the user of the tool 116; and the outline viewer section 236 shows for example a content outline of the application 105 being designed/edited, and/or may augment other views by providing information about the currently selected object such as properties of the object selected in another view. It is recognised that the tool 116 aids the developer in creating and modifying the coded definition content of the components 400,402,404 in the structured definition language (e.g. in XML). Further, the tool 116 also aids the developer in creating, modifying, and validating the interdependencies of the definition content between the components 400,402,404, such as but not limited to message/data and screen/data relationships. It is also recognised that presentation on the display of wizard 604 and dialog 605 content for use by the developer (during use of the editors 600 and viewers 602) can be positioned in one of the sections 230,232,234,236 and/or in a dedicated wizard section (not shown), as desired.

The Eclipse Platform is built on a mechanism for discovering, integrating, and running modules called plug-ins (i.e. editors 600 and viewers 602). When the Eclipse Platform is launched via the UI 202 of the computer 201, the user is presented with an integrated development environment (IDE) on the display 206 composed of the set of available plug-ins, such as editors 600 and viewers 602. The various plug-ins to the Eclipse Platform operate on regular files in the user's workspace indicated on the display 206. The workspace consists of one or more top-level projects, where each project maps to a corresponding user-specified directory in the file system, as stored in the memory 210 (and/or accessible on the network 10), which is navigated using the navigator 230. The Eclipse Platform UI paradigm is based on editors, views, and perspectives. From the user's standpoint, a workbench display 206 consists visually of views 602 and editors 600. Perspectives manifest themselves in the selection and arrangements of editors 600 and views 602 visible on the display 206. Editors 600 allow the user to open, edit, and save objects. The editors 600 follow an open-save-close lifecycle much like file system based tools. When active, a selected editor 600 can contribute actions to a workbench menu and tool bar. Views 602 provide information about some object that the user is working with in the workbench. A viewer 602 may assist the editor 600 by providing information about the document being edited. For example, viewers 602 can have a simpler lifecycle than editors 600, whereby modifications made in using a viewer 602 (such as changing a property value) are generally saved immediately, and the changes are reflected immediately in other related parts of the display 206. It is also recognised that a workbench window of the display 206 can have several separate perspectives, only one of which is visible at any given moment. Each perspective has its own viewers 602 and editors 600 that are arranged (tiled, stacked, or detached) for presentation on the display 206.

Component Applications 105

Figure 3:
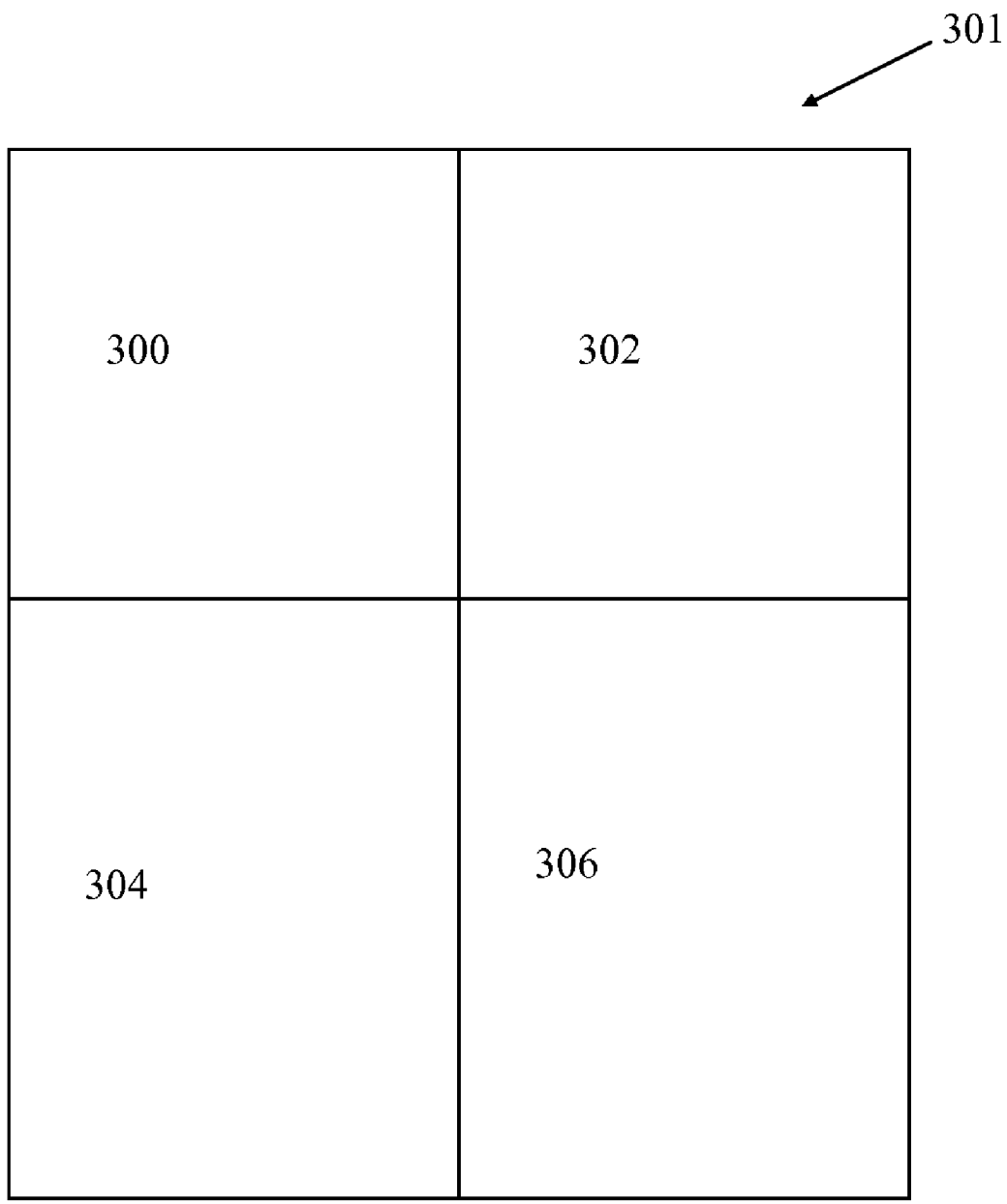
FIG. 3 is a block diagram of a component application package of FIG. 1.

Referring to FIG. 3, the application 105 packages have application elements or artifacts 301 such as but not limited to XML definitions 300, mappings 302, application resources 304, and optionally resource bundle(s) 306 for localization support. XML definitions 300 are XML coding of application data 400, messages 404, screens 402 components and workflow 406, part of the raw application 105. It is recognised that XML syntax is used only as an example of any structured definition language applicable to coding of the applications 105. Application mapping 302 defines the relationship of content in the application messaging to backend operation of the data sources 106. The application developer creates the mappings 302 using the tool 116, whereby the gateway AG utilizes this mapping 302 information during communication of the application 105 request/response messages between the runtime RE, of the devices 100, and the data sources 106. The resources 304 are one or more resources (images, soundbytes, media, etc. . . . ) that are packaged with the application 105 as static dependencies. For example, resources 304 can be located relative to a resources folder (not shown) such that a particular resource may contain its own relative path to the main folder (e.g. resources/icon.gif, resources/screens/clipart_1.0/happyface.gif, and resources/soundbytes/midi/inthemood.midi). The resource bundles 306 can contain localization information for each language supported by the application 105. These bundles can be locatred in a locale folder, for example, and can be named according to the language supported (e.g. locale/lang_en.properties and locale/lang_fr.properties). An example of the elements 301 are given below.

It is recognised that the runtime environment RE of the device 100 is the client-resident container within which the applications 105 are executed on the device 100. The container manages the application 105 lifecycle on the device 100 (provisioning, execution, deletion, etc.) and is responsible for translating the metadata (XML) representing the application 105 into an efficient executable form on the device 100. The application 105 metadata is the executable form of the XML definitions 300, as described above, and is created and maintained by the runtime environment RE. The RE can provide a set of common services to the application 105, as well as providing support for optional JavaScript™ or other scripting languages. These services include support for such as but not limited to UI control, data persistence and asynchronous client-server messaging. It is recognised that these services could also be incorporated as part of the application 105, if desired.

Figure 4:
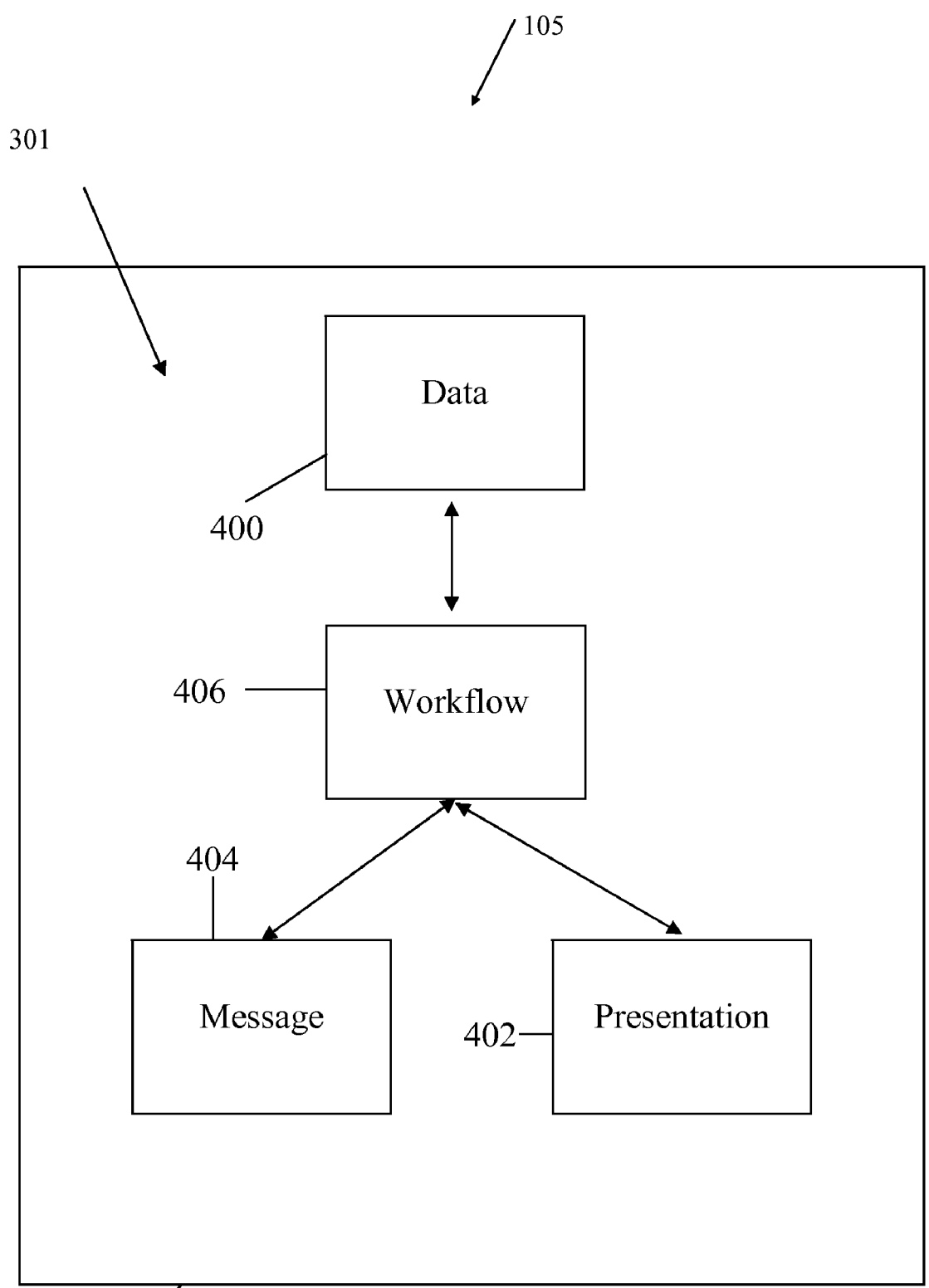
FIG. 4 is a block diagram illustrating example components of the application of FIG. 3.

Referring to FIG. 4, the component applications 105 are software applications which can have artifacts 301 written, for example, in eXtensible Markup Language (XML) and a subset of ECMAScript. XML and ECMAScript are standards-based languages which allow software developers to develop the component applications 105 in a portable and platform-independent way. A block diagram of the component application 105 comprises the data components 400, the presentation components 402 and the message components 404, which are coordinated by workflow components 406 through interaction with the client runtime environment RE of the device 100 (see FIG. 1) once provisioned thereon. The structured definition language (e.g. XML) can be used to construct the components 400, 402, 404 as a series of metadata records, which consist of a number of pre-defined elements representing specific attributes of a resource such that each element can have one or more values. Each metadata schema typically has defined characteristics such as but not limited to; a limited number of elements, a name of each element, and a meaning for each element. Example metadata schemas include such as but not limited to Dublin Core (DC), Anglo-American Cataloging Rules (AACR2), Government Information Locator Service (GILS), Encoded Archives Description (EAD), IMS Global Learning Consortium (IMS), and Australian Government Locator Service (AGLS). Encoding syntax allows the metadata of the components 400, 402, 404 to be processed by the runtime environment RE (see FIG. 1), and encoding schemes include schemes such as but not limited to XML, HTML, XHTML, XSML, RDF, Machine Readable Cataloging (MARC), and Multipurpose Internet Mail Extensions (MIME). The client runtime environment RE of the device 100 operates on the metadata descriptors of the components 400, 402, 404 to provision an executable version of the application 105.

Referring again to FIG. 4, the data components 400 define data entities which are used by the component application 105. Data components 400 define what information is required to describe the data entities, and in what format the information is expressed. For example, the data component 400 may define information such as but not limited to an order which is comprised of a unique identifier for the order which is formatted as a number, a list of items which are formatted as strings, the time the order was created which has a date-time format, the status of the order which is formatted as a string, and a user who placed the order which is formatted according to the definition of another one of the data components 400.

Referring again to FIG. 4, the message components 404 define the format of messages used by the component application 105 to communicate with external systems such as the web service. For example, one of the message components 404 may describe information such as but not limited to a message for placing an order which includes the unique identifier for the order, the status of the order, and notes associated with the order. It is recognised that data definition content of the components can be shared for data 400 and message 404 components that are linked or otherwise contain similar data definitions.

Referring again to FIG. 4, the presentation components 402 define the appearance and behavior of the component application 105 as it displayed by a user interface of the devices 100. The presentation components 402 can specify GUI screens and controls, and actions to be executed when the user interacts with the component application 105 using the user interface. For example, the presentation components 402 may define screens, labels, edit boxes, buttons and menus, and actions to be taken when the user types in an edit box or pushes a button. It is recognised that data definition content of the components can be shared for data 400 and presentation 402 components that are linked or otherwise contain similar data definitions.

Referring to FIGS. 1 and 4, it is recognized that in the above described client component application 105 definitions hosting model, the presentation components 402 may vary depending on the client platform and environment of the device 100. For example, in some cases Web Service consumers do not require a visual presentation. The application definition of the components 400, 402, 404, 406 of the component application 105 can be hosted in the Web Service repository 114 as a package bundle of platform-neutral data 400, message 404, workflow 406 component descriptors with a set of platform-specific presentation component 402 descriptors for various predefined client runtimes RE. When the discovery or deployment request message for the application 105 is issued, the client type would be specified as a part of this request message. In order not to duplicate data, message, and workflow metadata while packaging component application 105 for different client platforms of the communication devices 100, application definitions can be hosted as a bundle of platform-neutral component definitions linked with different sets of presentation components 402. For those Web Service consumers, the client application 105 would contain selected presentation components 402 linked with the data 400 and message 404 components through the workflow components 406.

Referring again to FIG. 4, the workflow components 406 of the component application 105 define processing that occurs when an action is to be performed, such as an action specified by a presentation component 402 as described above, or an action to be performed when messages arrive from the application gateway AG (see FIG. 1). Presentation, workflow and message processing are defined by the workflow components 406. The workflow components 406 are written as a series of instructions in a programming language (e.g. object oriented programming language) and/or a scripting language, such as but not limited to ECMAScript, and can be (for example) compiled into native code and executed by the runtime environment 206, as described above. An example of the workflow components 406 may be to assign values to data, manipulate screens, or send the message 105. As with presentation components, multiple workflow definitions can be created to support capabilities and features that vary among devices 100. ECMA (European Computer Manufacturers Association) Script is a standard script language, wherein scripts can be referred to as a sequence of instructions that is interpreted or carried out by another program rather than by the computer processor. Some other example of script languages are Perl™, Rexx™, VBScript™, JavaScript™, and Tcl/Tk. The scripting languages, in general, are instructional languages that are used to manipulate, customize, and automate the facilities of an existing system, such as the devices 100.

Referring to FIG. 4, the application 105 is structured using component architecture such that when the device 100 (see FIG. 1) receives a response message from the application gateway AG containing message data, the appropriate workflow component 406 interprets the data content of the message according to the appropriate message component 404 definitions. The workflow component 406 then processes the data content and inserts the data into the corresponding data component 400 for subsequent storage in the device 100. Further, if needed, the workflow component 406 also inserts the data into the appropriate presentation component 402 for subsequent display on the display of the device 100. A further example of the component architecture of the applications 105 is for data input by a user of the device 100, such as pushing a button or selecting a menu item. The relevant workflow component 406 interprets the input data according to the appropriate presentation component 404 and creates data entities which are defined by the appropriate data components 400. The workflow component 406 then populates the data components 400 with the input data provided by the user for subsequent storage in the device 100. Further, the workflow component 406 also inserts the input data into the appropriate message component 404 for subsequent sending of the input data as data entities to the data source 106, web service for example, as defined by the message component 404.

The following example, referring to FIG. 4, shows how a Web Services client application 105 could be expressed using a structured definition language, such as but not limited to XML, and a platform neutral scripting/programming language, such as but not limited to ECMAScript, with defined components conforming with the following Document Type Definition (DTD):

```
<!ELEMENT wcApp (desc?, iconUrl?, res*, wcData*, wcMsg*, style*,
wcScr*, wcFlow)>
<!ATTLIST wcApp
    name CDATA #REQUIRED
    title CDATA #IMPLIED
    vendor CDATA #IMPLIED
    version CDATA #IMPLIED
    transportKey CDATA #IMPLIED
    installNotifURL CDATA #IMPLIED
    registerURL CDATA #IMPLIED
>
<!ELEMENT desc (#PCDATA)>
<!ELEMENT iconUrl (#PCDATA)>
<!ELEMENT res (#PCDATA)>
<!ATTLIST res
    name CDATA #REQUIRED
    url CDATA #REQUIRED
    type (xml | image | sound | any) #REQUIRED
    deferred (true | false) "false"
>
Example Data Component 400
<!ELEMENT wcData (dfield+)>
<!ATTLIST wcData
    name CDATA #REQUIRED
    persisted (true | false) "true"
>
<!ELEMENT dfield (#PCDATA)>
<!ATTLIST dfield
    name CDATA #REQUIRED
    type (String | Number | Boolean | Date | Any) "Any"
    array (true | false) "false"
    cmp (true | false) "false"
    cmpName CDATA #IMPLIED
    key (0 | 1 | 2) "0"
>
Example Message Component 404
<!ELEMENT wcMsg (mfield*)>
<!ATTLIST wcMsg
    name CDATA #REQUIRED
    mapping CDATA #IMPLIED
>
<!ATTLIST wcMsg
    pblock CDATA #IMPLIED
>
<!ELEMENT mfield (#PCDATA)>
<!ATTLIST mfield
    name CDATA #REQUIRED
    type (String | Number | Boolean | Date | Array | XML) #IMPLIED
    mapping CDATA #IMPLIED
>
Example Presentation Components 402
```

The Example Presentation Components 402 has been submitted as a text file entitled "11078430_1.txt" in a computer program listing appendix on a compact disc. The information and/or data contained therein is incorporated by reference in its entirety.

```
Example Workflow Component 406
<!ELEMENT wcFlow (pblock+)>
<!ELEMENT pblock (#PCDATA)>
<!ATTLIST pblock
    id CDATA #REQUIRED
    param CDATA #IMPLIED
>
```

Figure 5:
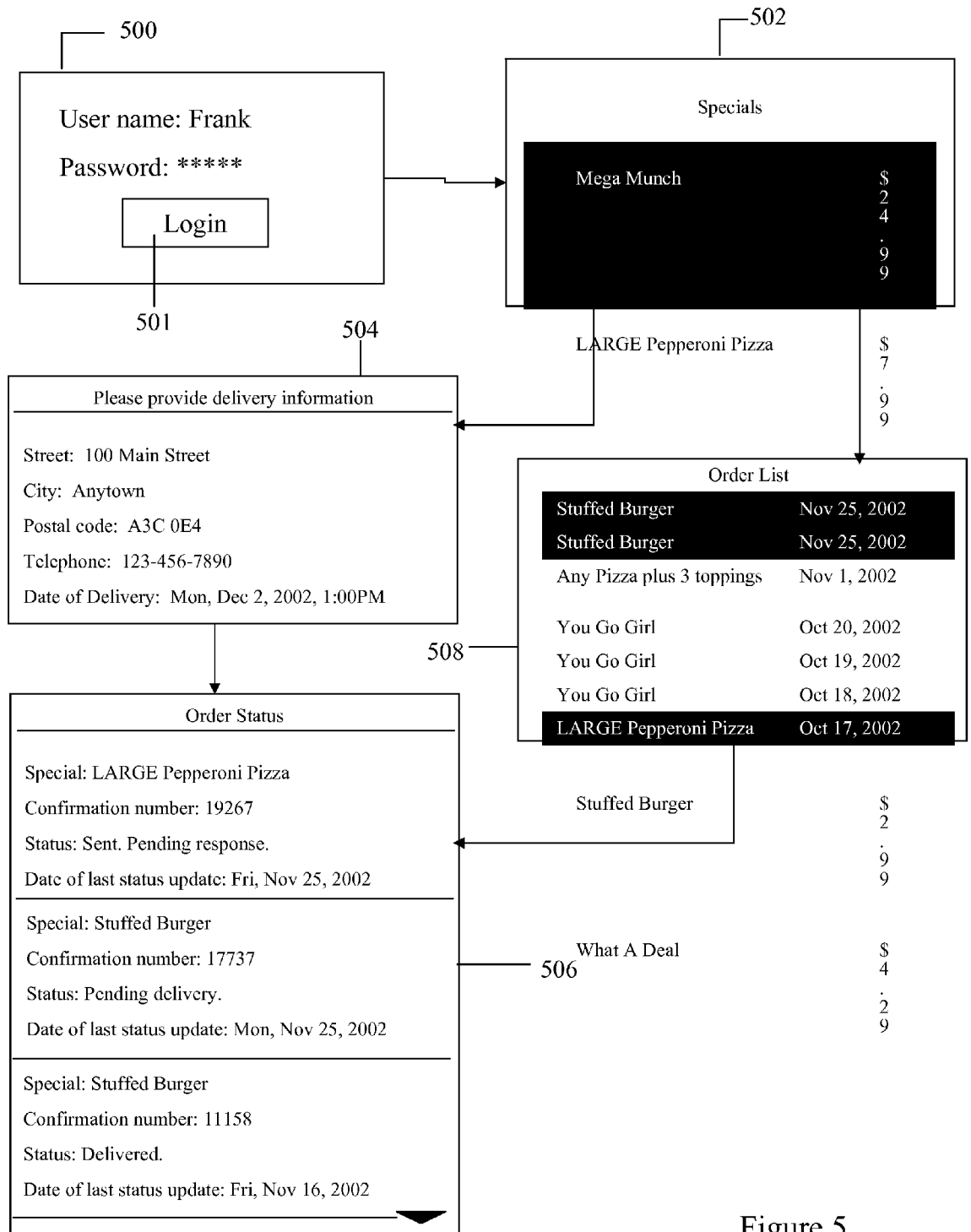
FIG. 5 shows example screens and workflow for a sample component application of FIG. 3.

The example component application program 105 displayed in FIG. 5 is represented in XML and mEScript as submitted as a text file entitled "11078430_2.txt" in a computer program listing appendix on a compact disc, including data components 400 as "wcData", message components 404 as "wcMsg", presentation components 402 as "wcScr" and workflow components 406 as "wcFlow" for processing the other components 400, 402, 404. The information and/or data contained 11078430_2.txt is incorporated by reference in its entirety.

As given above, the XML elements define the example component application 105 including a wcApp element, a wcData element, a wcMsg element, a wcSrc element, and a wcFlow element. Referring to FIG. 4, the wcApp element is a top-level element which defines the component application 105. The wcData element defines the example data component 400, which is comprised of a group of named, typed fields. The wcMsg element defines the example message component 404, which similarly defines a group of named, typed fields. The wcSrc element defines the example presentation component 402. The example presentation component 402 is a label, a separator, an image, a button, an edit field, a text area, a single-selection list, a multi-selection list, a droplist, a checkbox, a radio button, or a screen containing a group of other presentation components 402. The presentation components 402 included in the example component application 105 define a login screen 500, a specials screen 502, a delivery information screen 504, an order list screen 508, and an order status screen 506. These screens would be presented on the user interface of the device 100. The wcFlow element defines the example workflow components 406. The pblock attributes of the XML elements specify a pblock element nested in the wcFlow element. Each pblock element comprises script which defines part of the workflow of the component application 105. The script is written in ECMAScript by way of example only.

In order to define the behavior of the component application 105, the workflow components 406 use ECMAScript to reference and manipulate the data components 400, the presentation components 402, and the message components 404. Workflow components 406 can also reference external object types, which allow actions to be performed on the components defined in the component application 105. For example, a wcMsg type allows a message defined by a message component 404 to be evaluated to determine whether mandatory fields have been supplied, and to be sent to an external system such as the web service 106. A wcData type allows the size of collections of data entities defined by data components 400 to be determined, and allows data entities to be deleted. A wcScr type allows a presentation component 402 to be displayed to the user. Similarly, a special dialog external object allows a message to be displayed to the user on the user interface of the device 100. The message components 404 relay the required data for the input and output of the messages of the application 105. The corresponding data components 400 coordinate the storage of the data in memory of the device 100 for subsequent presentation on the user interface by the presentation components 402. The workflow components 406 coordinate the transfer of data between the data 400, presentation 402, and message 404 components. The workflow components 406 are written as a series of instructions, such as but not limited to ECMAScript, which is described above.

The above described component based application 105 architecture can result in component applications 105 in which the user-interface of the device 100 and the definition of the data are decoupled. This decoupling allows for modification of any component 400, 402, 404, 406 in the component application 105 while facilitating insubstantial changes to other components 400, 402, 404, 406 in the application 105, and thus can facilitate maintenance of the component applications 105, including modification and updating of the component applications 105 on the device 100.

Designer Tool 116 Architecture

FIG. 6 illustrates the overall designer tool 116 structure for designing component applications 105. The designer tool 116 interface (UI 202 and display 206—see FIG. 2) is primarily a user facing module 601 collection of graphical and text editors 600, viewers 602, dialogs 605 and wizards 604. The large majority of external interactions are accomplished through one or more of these editors 600, with the developer/user, using a system of drag and drop editing and wizard driven elaboration. The secondary and non-user facing system interface is that of the "Backend", whereby the tool 116 connects to and digests datasource 106 services such as Web Services and SQL Databases. As described above, the tool 116 can be built on the Eclipse platform, whereby the user interface system components can be such as but not limited to components of editors 600, viewers 602, dialogs (not shown) and wizards 604, which are plug-in modules 601 that extend Eclipse classes and utilize the Eclipse framework, for example. As shown, the tool 116 communicates with backend data sources 106 and UDDI repositories 114 and registries 112. These external systems 106, 112, 114 may not be part of the tool 116 but are shown for completeness.

The tool 116 has a UI Layer 606 composed mainly of the editors 600 and viewers 602, which are assisted through the workflow wizards 605. The layer 606 has access to an extensive widget set and graphics library known as the Standard Widget Toolkit (SWT), for Eclipse. The UI layer 606 modules 601 can also make use of a higher-level toolkit called JFace that contains standard viewer classes such as lists, trees and tables and an action framework used to add commands to menus and toolbars. The tool 116 can also use a Graphical Editing Framework (GEF) to implement diagramming editors such as the Workflow Editor 702 and the Relationship Editor 704 (see FIG. 7). The UI layer 606 modules 601 can follow the Model-View-Controller design pattern where each module 601 is both a view and a controller. Data models 608,610 represents the persistent state of the application 105 and are implemented in the data model layer 612 the tool 116 architecture. The separation of the layers 606, 612 keeps presentation specific information in the various views and provides for multiple UI modules 601 (e.g. editors 600 and viewers 602) to respond to data model 608,610 changes. Operation by the developer of the editors 600 and viewers 602 on the display 202 (see FIG. 2) is assisted by the wizards 604 for guiding the development of the application 105. The application development patterns or development guides 948 (see FIG. 13). The patterns fall into one of the following general categories, such as but not limited to: Recommendation patterns 654; Development approach patterns 650; Validation patterns 660; Messaging patterns 658; Screen patterns 656; and Script patterns 652 as further described below in relation to FIG. 13.

The tool 116 data models 608,610 can be based on the Eclipse Modeling Framework (EMF). EMF is a framework and code generation facility. The framework provides model 608,610 change notification, persistence support and an efficient reflective API for manipulating EMF objects generically. The code generation facility is used to generate the model 608,610 implementation and create adapters to connect the model layer 612 with the user interface modules 601 of the UI layer 606.

A tool 116 service layer 614 provides facilities for the UI layer 606 such as validation 620, localization 624, generation 622, build 626 and deployment 628, further described below. The tool 116 can make use of the Eclipse extension point mechanism to load additional plug-ins for two types of services: backend connectors 616 and device skin managers 618 with associated presentation environments 630.

The backend connector 616 defines an Eclipse extension point to provide for the tool 116 to communicate with or otherwise obtain information about different backend data sources 106, in order to obtain the message format of the selected data source 106. The backend connector 616 can be used as an interface to connect to and to investigate backend datasource 106 services such as Web Services and SQL Databases. The backend connector 616 facilitates building a suitable application message and data set to permit communication with these services from the application 105 when running on the device. The backend connector 616 can support the access to multiple different types of data sources 106, such as but not limited to exposing respective direct communication interfaces through a communication connector based architecture. At runtime the tool 116 reads the plug-in registry to add contributed backend extensions to the set of backend connectors 616, such as but not limited to connectors for Web Services.

The Backend Connector 616 can be responsible for such as but not limited to: connecting to a selected one (or more) of the backend data sources 106 (e.g. WebService, Database); providing an interface for accessing the description of the backend data source 106 (e.g. messages, operations, datatypes); and/or providing for the identification of Notification services (those which push notifications over the network 10 to the device 100—see FIG. 1). The Backend Connector 616 can provide an interface to the backend datasource 106 (e.g. a web service, SQL Database or other) for access of the data source description, and can provide a level of abstraction between implementation specific details of the backend messaging and generic messaging descriptions 302 maintained by the Design Time Data Model 608. For example, the Backend Connector 616 can be used to generate appropriate messaging 404 and data 400 component sets for the application 105, and is used by the Model Validator 620 as part of validation tasks to verify the sanity of existing message mapping 302 relationships in the application 105 under development. For example, the backend connector 616 can be implemented as an interface using an API call as the protocol to access the underlying backend data source 106 (e.g. using a WSDL Interface for WebServices)

The device skin manager 618 defines an Eclipse extension point, for example, to allow the tool 116 to emulate different devices 100 (see FIG. 1), such that the look and feel of different target devices 100 (of the application 105) can be specified. At runtime the tool 116 reads the plug-in registry to add contributed skin extensions or presentation environments 630 to the set of device environments 630 coordinated by the manager 618, such as but not limited to environments 630 for a generic BlackBerry™ or other device 100. The Skin Manager 618 is used by the Testing/Preview viewer 806 to load visual elements (as defined by the screen component 402 of the data model 608,610) that look appropriate for the device 100 that is being emulated, i.e. elements that are compatible with the specified environment 630. Different skins or presentation environments/formats 630 are "pluggable" into the manager 618 of the tool 116, meaning that third parties can implement their own presentation environments 630 by creating new unique SkinIds (an Eclipse extension point), for example, and implementing an appropriate interface to create instances of the screen elements supported by the runtime environment RE of the emulated device 100. In order to load a new presentation environment 630, the Testing/Preview viewer 806 first asks the Manager 618 for an instance of the specified environment 630. The Manager 618 then instantiates the environment 630 and the Testing/Preview viewer 806 uses the specified environment 6320 to construct the screen elements according to the screen components 402 of the model 608,610. For example, the presentation environments 630 (e.g. SkinPlugins) are identified to the SkinManager 618 through a custom Eclipse extension point using the Eclipse framework.

Referring to FIG. 6, the UI Layer 606 is comprised of the set of editors 600, viewers 602, wizards 604 and dialogs 605. The UI Layer 606 uses the Model-View-Controller (MVC) pattern where each UI module 601 is both a View and a Controller. UI Layer modules 601 interact with the data models 608,610 with some related control logic as defined by the MVC pattern. The editors 600 are modules 601 that do not commit model 608,610 changes until the user of the tool 116 chooses to "Save" them. An example of an editor 600 is the Script Editor 706 (see FIG. 7), further described below. Viewers 602 are modules 601 that commit their changes to the model 608,612 immediately when the user makes them. An example of a viewer 602 is the Navigator (Project View) 802 (see FIG. 8). Wizards 604 are modules 601 that are step-driven by a series of one or more dialogs 605, wherein each dialog 605 gathers certain information from the user of the tool 116 via the user interface 202 (see FIG. 2). No changes are applied to the design time model 608 using the wizards 604 until the user of the tool 116 selects a confirmation button like a "Finish". It is recognised in the example plug-in design tool 116 environment, modules 610 can extend two types of interfaces: Eclipse extension points and extension point interfaces. Extension points declare a unique package or plug-in already defined in the system as the entry point for functional extension, e.g. an editor 600, wizard 604 or project. Extension point interfaces allow the tool 116 to define its own plugin interfaces, e.g. for skins 618 and backend 616 connectors.

Referring again to FIG. 6, modules 601 (primarily Editors 600 and Viewers 602) in the tool 116 are observers of the data models 608,610 and are used to interact or otherwise test and modify the data models 608,610 of the application (e.g. components 400, 402, 404, 406—see FIG. 4) in question. When the data model 608,610 changes, the models 608,610 are notified and respond by updating the presentation of the application 105. The tool 116 uses the Eclipse Modeling Framework (EMF), for example, to connect the Eclipse UI framework to the tool 116 data model 608,610, whereby the modules 601 can use the standard Eclipse interfaces to provide the information to display and edit an object on the display 206 (see FIG. 2). In general, the EMF framework implements these standard interfaces and adapt calls to these interfaces by calling on generated adapters that know how to access the data model 608,610 residing in memory 210. The design time Data Model 608 is the current version of the application 105 in development and is accessed by the users employing the modules 601 to interact with the associated data of the model 608. Modules 601 can also trigger validation actions on the Design Time Data Model 608. Modules 601 can also cause some or all of the application 105 to be generated from the Design Time Data Model 608 resident in memory 210. In general, the Design Time Data Model 608 accepts a set of commands via the UI 202 (see FIG. 2) that affect the state of the model 608, and in response may generate a set of events. Each module 601 (editor 600 and viewer 602) described includes the set of commands and the events that affect the module 601 and data model 608 pairing.

Figure 8:
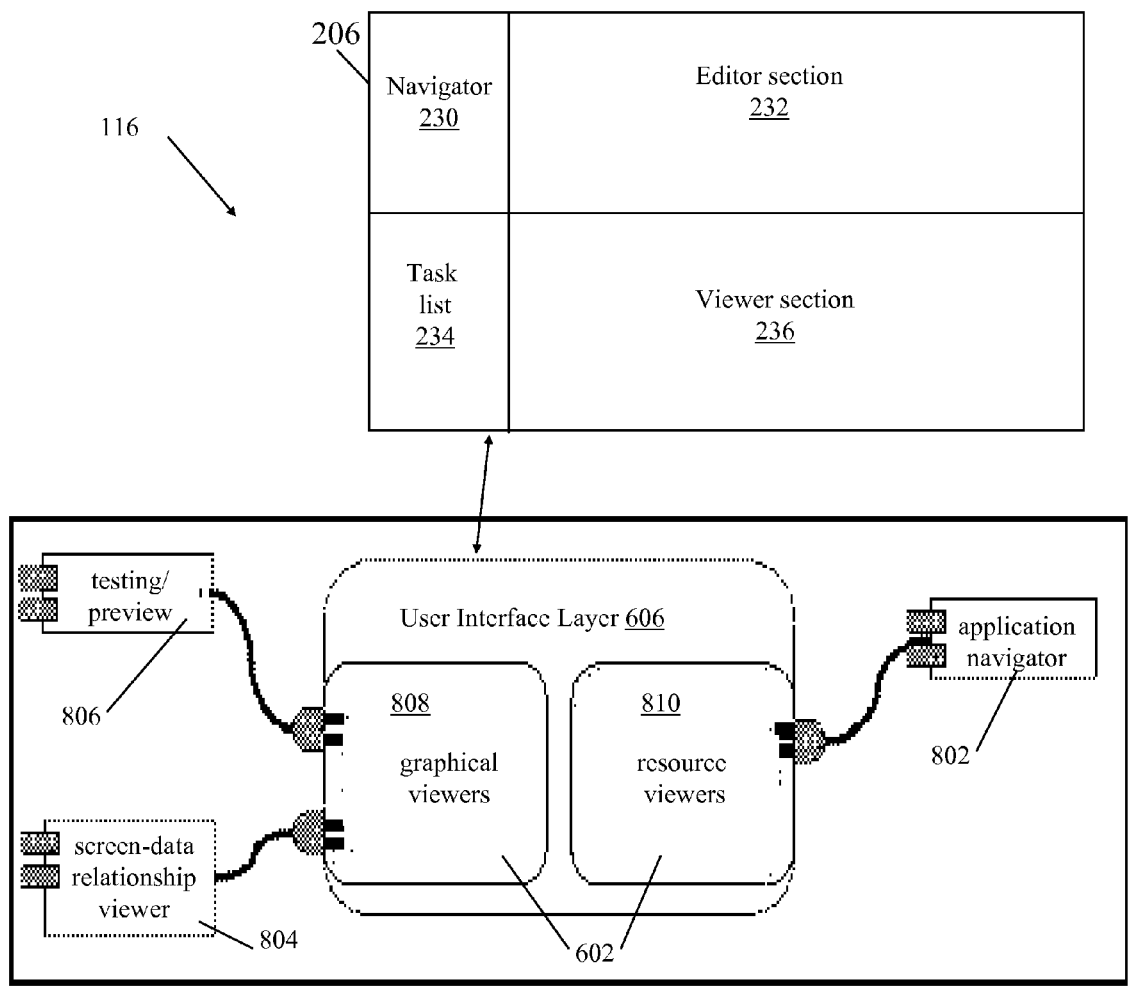
FIG. 8 shows viewers of the tool of FIG. 6.

Referring to FIGS. 6 and 8, the Runtime Data Model 610 represents the state of an emulated application 105 under development by the tool 116, using as a basis the contents of the design time data model 608. The runtime data model 610 stores values for the following major items, such as but not limited to: Data Components 400 (see FIG. 4); Global Variables; Message Components 404; Resources 304,306 (see FIG. 3); Screen Components 402 and Styles. The Runtime Data Model 610 collaborates with the Design Time Data Model 608 and a Testing/Preview viewer 806 during emulation of application 105 for testing and preview purposes (for example). The viewer 806 also collaborates with the skin manager 616 for emulating the runtime data model 610 for a specified device 100 type. The Runtime Data Model 610 also notifies, through a bridge 613, the viewer 806 as well as any other modules 601 of the UI layer 606 associated with changes made to the model 610. For example, an API call can be used as a notifier for the associated modules 601 when the state of the model 610 has changed.

Referring to FIGS. 6 and 4, the Design Time Data Model 608 represents the state of an application 105 development project and interacts with the modules 601 of the UI layer 606 by notifying modules 601 when the state of the model 608 has changed as well as saving and loading objects from storage 210. The model's 608 primary responsibility is to define the applications 105 including such as but not limited to the following items: Data Component 400 Definitions; Global Variable Definitions; Message Component 404 Definitions; Resource 304,306 Definitions; Screen Component 402 Definitions; Scripts 406; Style Definitions and Backend data source 106 Mapping 302 Descriptors. The Design Time Data Model 608 responds to commands of each editor 600, viewer 602. The Design Time Data Model 608 also fires events to modules 601 in response to changes in the model 608, as well as collaborating/communicating with the other modules 601 (module 601-module 601 interaction) by notifying respective modules 601 when the data model 608 has changed. The data model 608 depends on an interface in order to serialize model 608 content retrieval and storage to and from the memory 210.

The following describes the mechanism used by the tool 116 editors 600 and viewers 602 to interact with the data model 608. The EMF.Edit framework is an optional framework provided by the Eclipse framework. The tool 116 can use the EMF.Edit framework and generated code (for example) as a bridge or coupling 613 between the Eclipse UI framework and the tool data model 608. Following the Model-View-Controller pattern, the editors 600 and viewers 602 do not know about the model 608 directly but rely on interfaces to provide the information needed to display and edit the data in the model 608.

In general, for example a tree viewer uses a TreeContentProvider and LabelProvider interface to query the structure of the tree and get text and icons for each node in the tree respectively. Table viewers and list viewers work in a similar way but use the structured ContentProvider and LabelProvider interfaces. Each class in the data model 608 is a change notifier, that is, anytime an attribute or reference is changed an event is fired. In EMF, for example, a notification observer is called an adapter because not only does it observe state changes but it can extend the behaviour of the class it is attached to (without subclassing) by supporting additional interfaces. An adapter is attached to a model object by an adapter factory. An adapter factory is asked to adapt an object with an extension of a particular type. The adapter factory is responsible for creating the adapter or returning an existing one, the model object does not know about adapting itself. The tool 116 uses EMF to generate a set of adapters for the data model 608 called item providers. Each item provider is an adapter that implements provider interfaces to extend the behaviour of the model object so it can be viewed and edited and at the same time is a notification observer that can pass on state changes to listening views. The tool 116 connects the editors 600 and viewers 602 to the data model 608 by configuring the editors 600 and viewers 602 with one or more EMF.Edit classes, for example. Each EMF.Edit class supports an Eclipse UI provider interface. The EMF.Edit class implements an interface call by delegating to an adapter factory. The adapter factory then returns a generated adapter (an item provider) that knows how to access the data model 608. When the state of the model 608 changes the same adapters are used to update the viewers 602 and editors 600.

The following commands are example commands that can affect other related modules 601 of the UI layer 606: ComponentAdded—a component (i.e. Screen, Data etc.) has been added to the application 105; ComponentRemoved—a component has been removed from the application 105; ComponentRenamed—a component has been renamed; NavigationControlChanged—a button or menu item has been added, removed or had its properties changed on a screen (e.g. component 402) of the application 105; DataBindingChanged—a data-bound control (of a message 404, data 400 and/or presentation 402 component) has been added, removed or had its properties changed on a screen; ScreenParameterListChanged—a parameter has been added or removed from one of the screen components 402; FieldMappingChanged—a message level, field level or prototype mapping has changed; MessageContainmentChanged—a containment relationship has changed; MessageFieldChanged—a message field has been added, removed or had its properties changed for a message 404 and/or a screen 402 component; DataFieldChanged—a data field has been added, removed or had its properties changed from a message 404, data 400 and/or presentation 402 component; NavigationChanged—a script that may contain navigation code has changed of a workflow component 406; LocalizedStringChanged—a literal string has been added, removed or changed and ExitCodeChanged—Exit code has been added or removed from a script of the workflow component 406.

The model validation 620 of the service layer 614 provides facilities for the UI layer 606 such as validating the design time data model 608. The Model Validator 620 is used to check that the Design Time Data Model 608 representation of application 105 messages is in line with the backend data source 106 presentation of messaging operations. The Model Validator 620 can be responsible to validate the model 608 representation of the application 105 to be generated, for example such as but not limited to elements of: workflow sanity of the workflow component 406; consistency of parameters and field level mappings of the components 400, 402, 404, 406; screen control mappings and screen refresh messages of the screen components 402; message and/or data duplications inter and intra component 400,402,404,406. Another function of the validation 620 can be to validate the model's 608 representation of backend data source 106 messaging relationships. In order to achieve its responsibilities, the validator collaborates with the Design Time Data Model 608, an application generator 622 and the backend connector 616. Requests to the Model Validator 620 to validate the model 608 (or a portion of the model 608—on demand) are made through the application generator 622, using the tool user interface 202 for example, via a Validate Model interface (not shown) connecting the generator 622 to the validator 620. The Model Validator 620 in turn utilizes as part of the validation task the Design Time Data Model 608, which contains both the application 105 and mapping file meta model information, as well as the backend connector 616, which supports the interface to the backend data sources 106.

Figure 9:
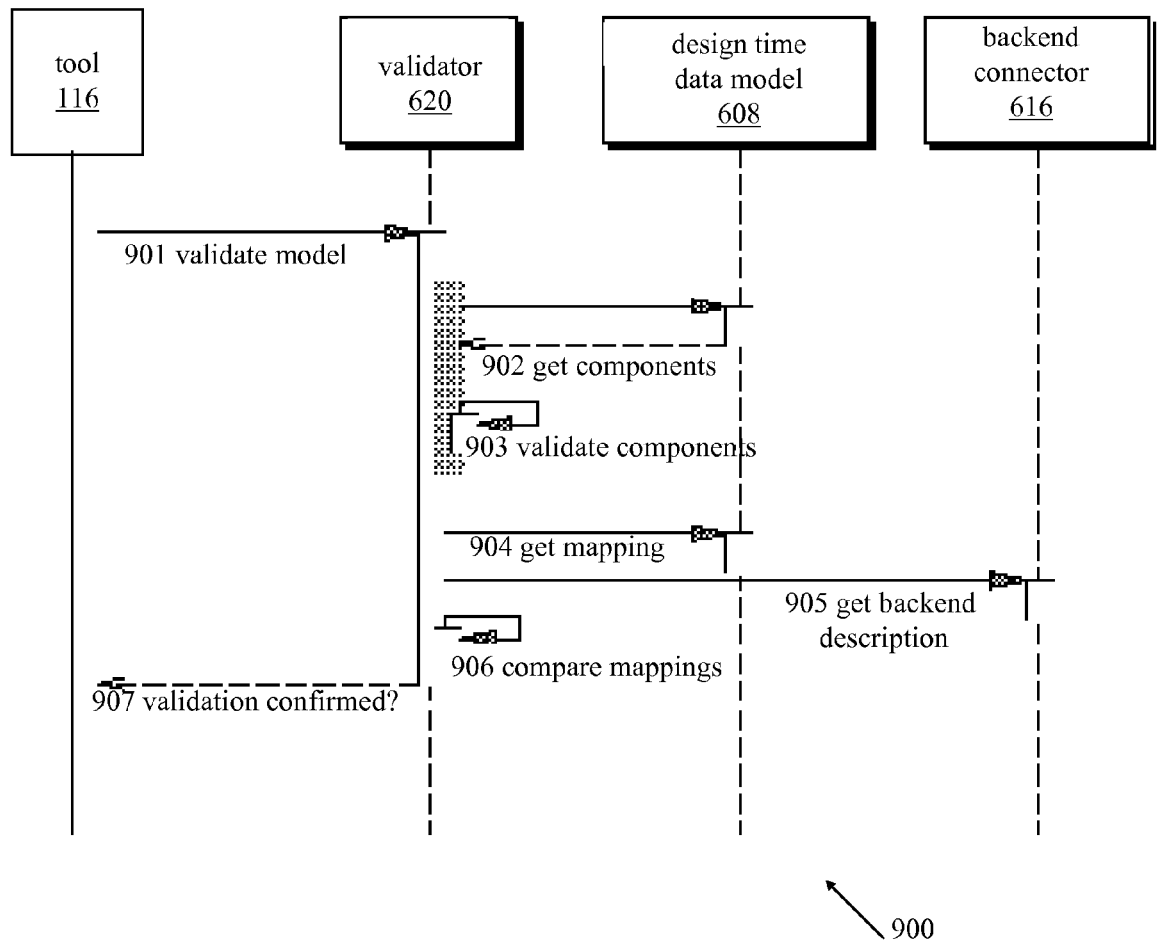
FIG. 9 shows a method of application validation using the tool of FIG. 6.

Referring to FIGS. 6 and 9, a model 608 validation sequence 900 is shown. First the validator 620 is requested 901 to validate the model 608. The validator obtains 902 all components 400,402,404,406 from the data model 608 and in turn validates 903 the contents of each component 400,402, 404,406. The validator 620 then gets 904 the backend mappings 302 from the data model 608 and then obtains 905 mapping information of the backend data sources 106. A comparison is then made 906 in order to validate 907 the model 608.

Referring again to FIG. 6, the localization Service 624 has responsibilities such as but not limited to: supporting a build time localization of user visible strings; supporting additional localization settings (e.g. default time & date display format, default number display format, display currency format, etc); and creating the resource bundle files 306 (and resources 304) that can be used during preparation of the deployable application 105 (e.g. an application jar file) by a BuildService 626. For example, the localization service 624 can be implemented as a resource module for collecting resources 304,306 that are resident in the design time data model 608 for inclusion in the deployable application 105. The JAR file can be a file that contains the class, image, and sound files for the application gathered into a single file and compressed for efficient downloading to the device 100. The Localization Service 624 is used by the application Generator 622 to produce the language specific resource bundles 306, for example. The BuildService 626 implements preparation of the resource bundles 306 and packaging the resource bundles 306 with the deployable application 105. The Localization Service 624 interacts (provides an interface) with the tool editors 600 and viewers 602 for setting or otherwise manipulating language strings and locale settings of the application 105.

Referring to FIG. 6, the application Generator 622 can be responsible for, such as but not limited to: generation of the application XML from the components 400,402,404; generation of mapping 302 descriptors; optimizing field ordering of the component 400,402,404 descriptors; and generation of dependencies and script transformation as desired for storage in the memory 210. The application Generator 622 collaborates with the Design Time Data Model 608 to obtain the content of the developed components 400, 402,404 comprising the application 105. The application Generator 622 utilizes the Model Validator 620 to check that both the application 105 definitions (of the components 400,402,404,406) and mapping 302 description information are correct. The application Generator 620 then produces the XML code, with inclusions and/or augmentations of the script of the workflow components 406, and mapping 302 file descriptor from relationships held in the Design Time Data Model 608. The application Generator 622 uses the Localization Service 624 to produce the language resource bundles 306, through for example a Resource Bundles interface (not shown). The application Generator 622 generation process is kicked off through a Generate application interface accessed by the developer using the UI 202 of the tool 116 (i.e. by user input events such as mouse clicks and/or key presses). It is recognised that the generator 622 can be configured as a collection of modules, such as but not limited to a code module for generating the XML 301 (which may include associated script) and a mappings module for generating the mapping 302 descriptors.

Figure 10:
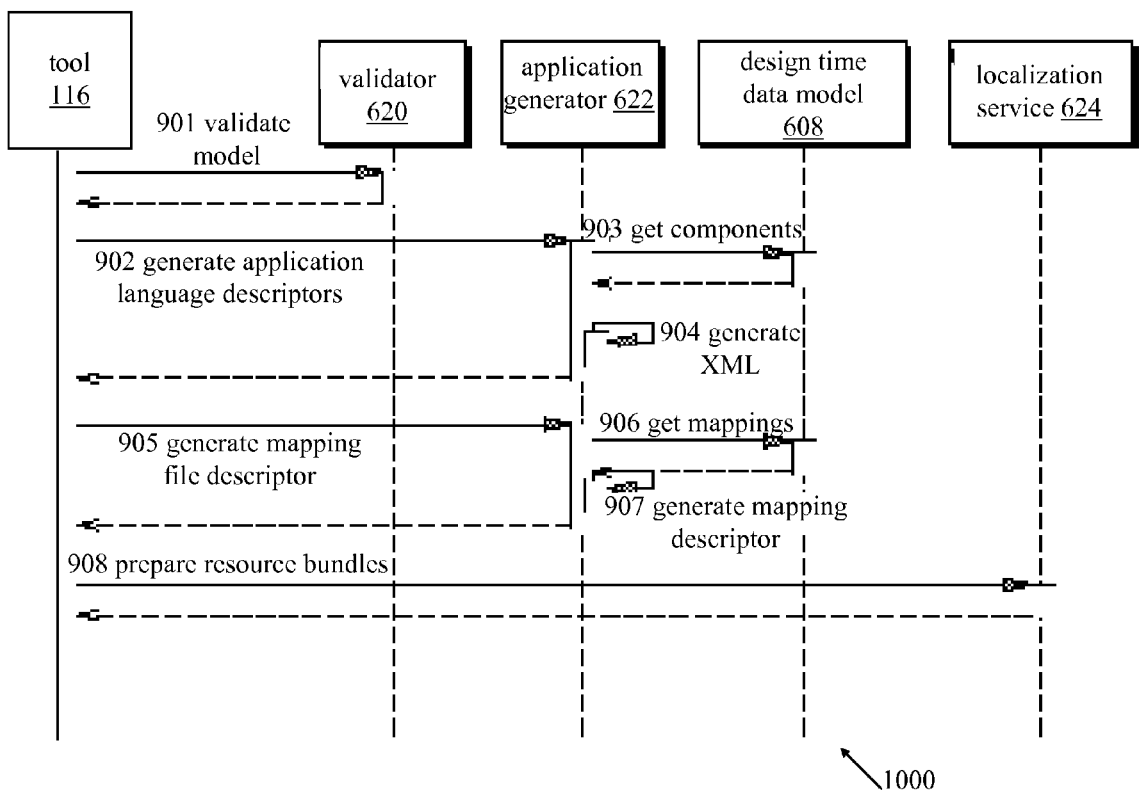
FIG. 10 shows a method of application generation using the tool of FIG. 6.

Referring to FIGS. 6 and 10, a sequence 1000 of generating the application artifacts 301 for the application 105, including the generation of mapping 302 files is shown. At step 1001 validate model 608 is performed by the validator 620. At step 1002 the application language descriptors (e.g. XML) 300 (which may include associated script) are generated by the generator 622 by getting 1003 the components 400,402,404, 406 from the model 608 and generating 1004 the corresponding XML 300. At step 1005 the backend mapping 302 file descriptors are generated by the generator 622 by obtaining 1006 the mappings from the data model 608 and then generating 1007 the backend mapping descriptors. At step 1008 the resource bundles 306 (and resources 304) are prepared by the localization service 624 to add to the application 105, as described above with reference to FIG. 3. The generated artifacts 310 of the application 105 are stored in the memory 210.

Referring again to FIGS. 2 and 6, the tool 116 can be a utility that runs on a single desktop computer 201. The tool 116 provides the main developer capability, which encapsulates the development, preview, validation and generation functions for application 105 development. However, it is recognised that a Build service 626 and/or a security service 632 can be packaged as a separate entity to permit the "homegrown" developer to create applications manually, separate from the other application development of the tool 116, and still utilize the preparation and security aspects of the deployable application 105 package (e.g. jar). It is also recognised that a Deployment service 628 can also be packaged separately to permit the "home-grown" developer to generate and deploy the appropriate application descriptor file. Accordingly, the tool 116 can make use of external build 626 and deployment 628 service utilities, internal build 626 and deployment 628 services (as shown in FIG. 6), or other configurations thereof as evident to a person skilled in the art.

Referring to FIGS. 3 and 6, the Build Service 626 provides an interface for building deployable form of the application 105 and is responsible for, such as but not limited to: generating a manifest file and generating the deployable application 105 jar file. The Build Service 626 uses available application XML 300 (which may include associated script), mapping descriptor files 302 and resource bundles 306 (and resources 304) as described above. The availability of these application 105 elements may be done either through the tool 116 application Generator 622, or manually in the case of the homegrown development approach using an external Build Service 626. The Security Service 632 is used to sign the manifest that contains unique information about the application 105. Finally, the Build Service 626 produces the deployable application 105 jar unit, including all artifacts and the signed manifest file. As noted above, the Build Service 626 can be packaged as a separate utility to the tool 116 and used by the tool 116 for packaging of the deployable application jar file.

Figure 11:
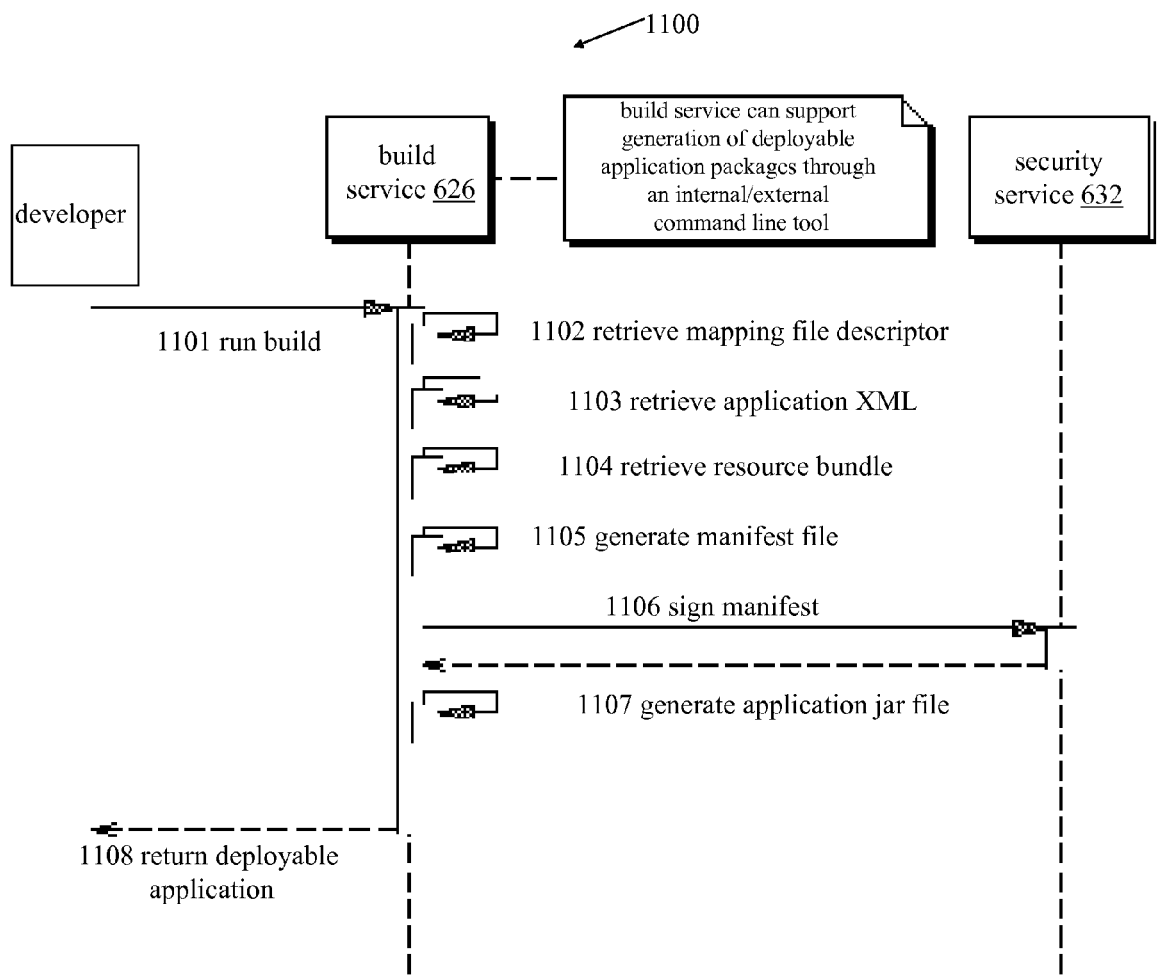
FIG. 11 shows a method of building a deployable application using application of FIG. 10.

Referring to FIGS. 6 and 11, the sequence 1100 of running the build service 626 to generate a deployable application 105 (e.g. as an application jar file) is shown. At step 1101 the developer initiates the build service 626 as either an internal (to the tool 116) or external as a separate utility once the application elements/artifacts 301 (see FIG. 3) have been generated by the application generator 622. At step 1102 the service 626 retrieves the available mapping 302 file descriptor and at step 1103 retrieves the available application XML 300 (which may include associated script). At step 1104 the service 626 retrieves the resources 304,306 and then generates 1105 the manifest file. At step 1106 the manifest is signed and then the application jar file is generated 1107. The deployable application 105 is then made available (e.g. stored in the memory 210) for eventual deployment by the deployment service 628.

Referring to FIG. 6, the Security Service 532 is employed to sign the manifest jar with a digest produced over the jar file contents and can have two main responsibilities, for example. First and foremost, the Security Service can be used to generate an IDE (integrated design environment) Tag that can be included in every application 105 jar file. Secondly, the Security Service 632 can provide a means to initialize a security infrastructure of the tool 116. The Build Service 626 interacts with the Security Service 632 at build time to produce the IDE Tag that can be part of every deployable application 105 jar manifest. The Security Service 632 can also interact with a build configuration element (not shown—potentially external to the service 632) for permitting configuration of the security service, such as but not limited to; initial setup of the signed certificate; for generation of new keys, generation of a key request, and installation of a signed certificate as is known in the art.

Referring again to FIG. 6, the Deployment Service 628 connects to the UDDI repository 114 to install/publish the generated application descriptor file, and can be responsible for generating the deployment descriptor of the application 105. The Deployment Service 628 uses the available application 105 jar file at deployment time. Although the Deployment Service 628 does not install the application 105 jar file, the service 628 introspects the jar file to determine what languages are supported (e.g. represented in the resource bundles 306). This information can be added to the descriptor file.

Figure 12:
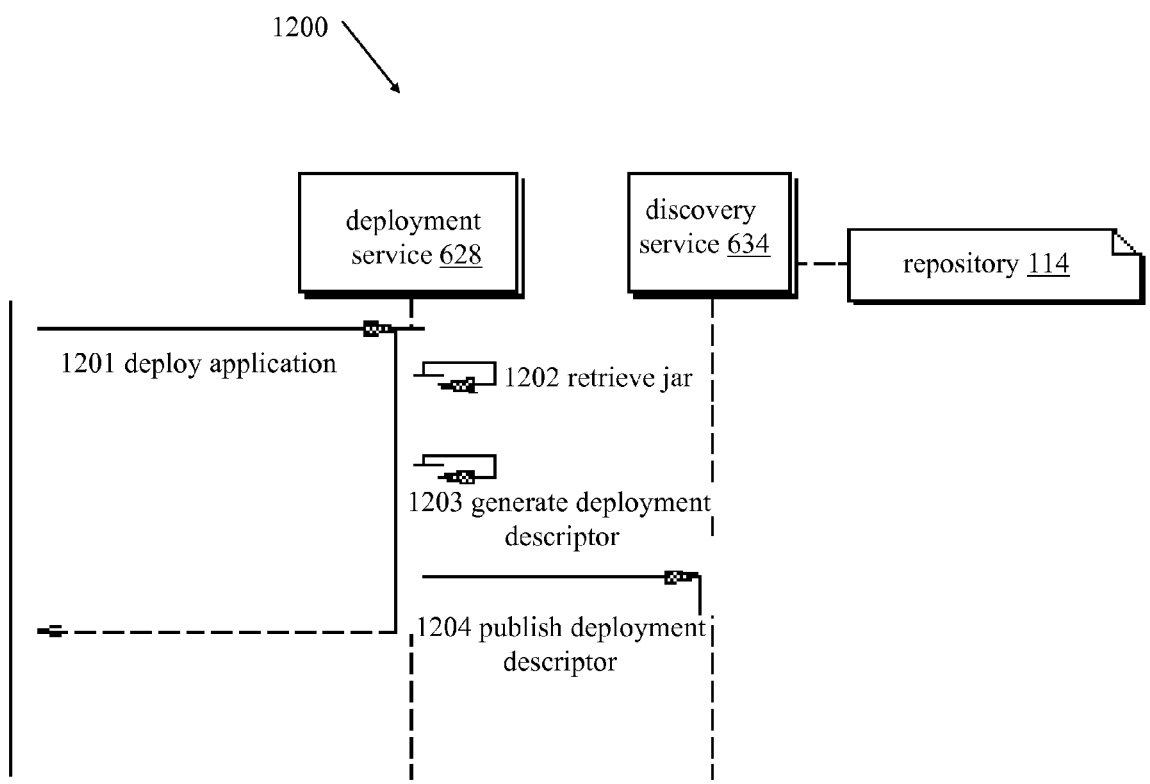
FIG. 12 shows a method of deploying the application of FIG. 11.

Referring to FIGS. 6 and 12, a sequence 1200 of deploying the application 105 to the UDDI (for example) repositories 114 is shown. At step 1201 the developer initiates the deployment service 628 as either an internal (to the tool 116) or external as a separate utility. At step 1202 the service 628 retrieves the available application jar. At step 1203 the service 628 generates the deployment descriptor of the application 105 and at step 1204 proceeds to publish the deployment descriptor through a discovery service 634 of the repository 114.

Figure 7:
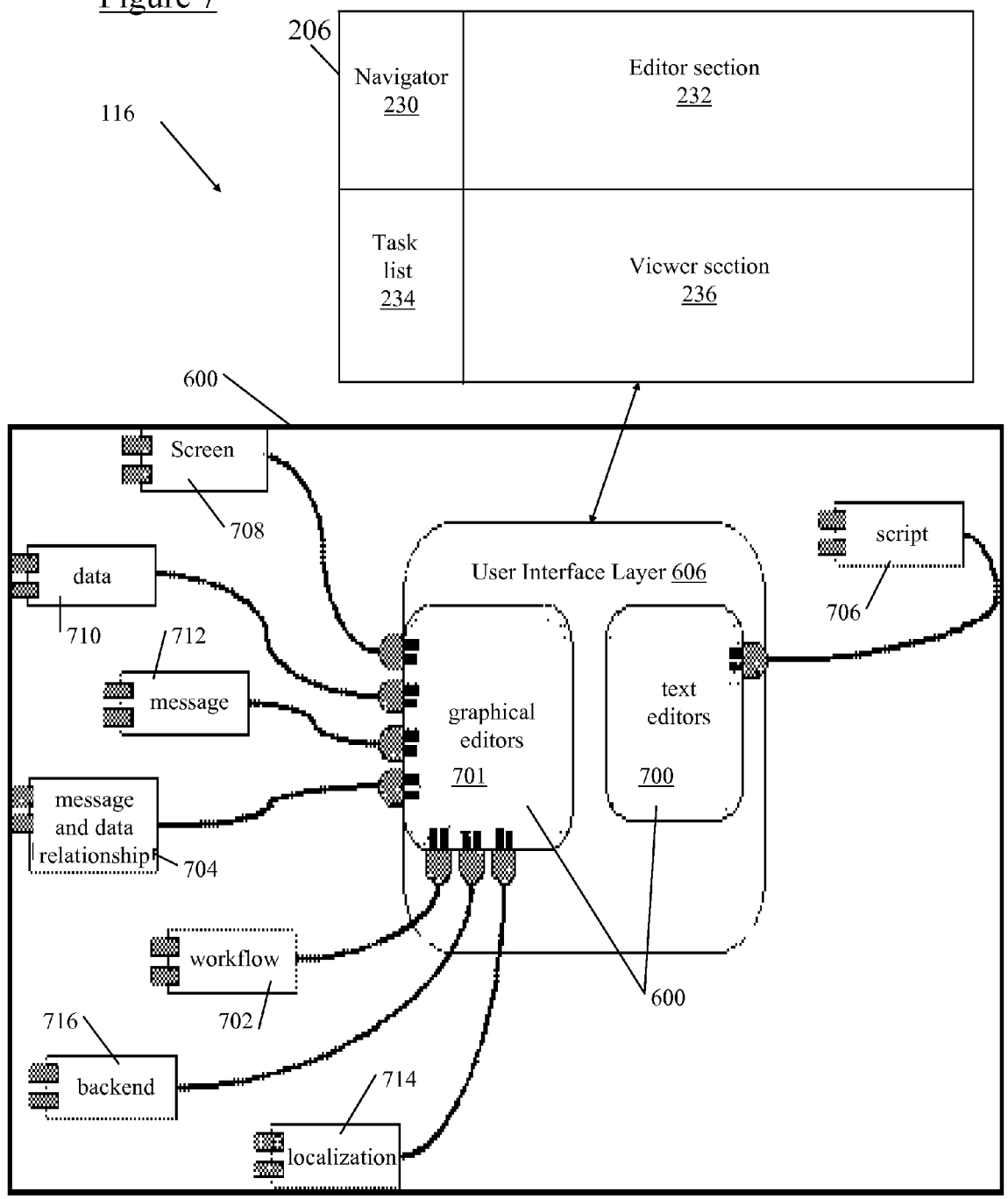
FIG. 7 shows editors of the tool of FIG. 6.

Referring to FIG. 7, the distribution of editors 600 in to Eclipse plug-ins (by way of example only) is shown. Tool editors 600 fall broadly into two categories, such as but not limited to the categories of: Text Editors 700 implement standard line based editing functionality and Graphical Editing Framework (GEF) Editors 701 that provide an edit space in which to draw objects. A GEF Editor 701 in the context of the tool 116 can contain a palette and a canvas, as is known in the art. The user can drop nodes (entities) from the palette onto the canvas and add connections (relationships) between them, so as to for example define the content and inter-relationships of the XML coding of the components 400, 402, 404, 406 (see FIG. 4). It is recognised that the editors 600 and viewers 602 are used to create and modify definitions contained in the components 400,402,404,406 s well as to create and modify the interdependencies of the definitions between the components (e.g. data-data, data-screen, message-data, screen-data, data-message) as further discussed below. It is recognised that the viewers 602 and editors 600 can be any combination of text based and/or graphical based modules 601, as desired.

Editors 600

For Editor 600 and Data Model 608 decoupling, the editor 600 does not know about the data model 608 directly. The editor 600 relies on a UI provider interface (of Eclipse) to get the information needed to render the object under edit. The editor 600 can be configured with an EMF core object, for example when using the Eclipse platform) that implements a UI provider interface. e.g. ContentProvider, LabelProvider.

The EMF provider object adapts UI calls by delegating to a generated adapter (ItemProvider) that knows how to access the data model 608.

In general, the editor 600 creates a command to change the model 608 so that the change can be undone through an undo API (not shown). These changes can be assisted by an appropriate wizard 604 for the development task at hand. The editor 600 can be configured with an EMF core object called an editing domain that maintains a command stack. The editing domain uses the adapter factory to find an adapter that can create the command. The generated adapter class (an Item-Provider) creates the command. The editor 600 executes the command by using the command stack. Further, using the Eclipse framework as an example, EMF models 608 are change notifiers. Because the ItemProvider is a notification observer it is notified when the data model 608 changes. The ItemProvider in turn notifies the Provider. The Provider tells the Editor 600 and PropertySheet to refresh after a change notification.

Script Editor 706

The script editor 706 is a constrained text editor for writing the commands (e.g. JavaScript™) of the application 105 components, such as but not limited to the workflow component 406—see FIG. 4. The interaction of the Developer with the editor 706 can be assisted or otherwise driven by the script patterns 652 (see FIG. 13), which can include patterns 652 such as but not limited to message origination 652a, control condition 652b and message reception 652c as further described below. Some syntax such as creating functions can be restricted where it is not user-definable in the component application 105. Example commands editable by the script editor 706 can include commands such as but not limited to SaveScript which is used when the user saves a script of the application 105. SaveScript can trigger the data model 608 commands of NavigationChanged, LocalizedStringChanged and ExitCodeChanged, if successful. Example input events of the script editor 706 can include events such as but not limited to: ComponentRemoved whereby if the component (400, 402, 404, 406) removed affects input parameters to the script or globals used by the script, the script editor 706 prompts the user of the tool 116 that the modified script is invalid; and ComponentRenamed which has the same interest as ComponentRemoved. An example interface of the script editor 706 extends the org.eclipse.ui.editors extension point of the Eclipse framework by implementing a subclass of the org.eclipse.ui.editors.texteditors hierarchy. The tool 116 coordinated the creation and/or modification of scripts in the (e.g. workflow 406) components as well as the inter-relation of the created/modified script affecting other associated components of the application 105.

Screen Editor 708

The screen editor 708 is responsible for facilitating the user of the tool 116 to define and laying out the structured definition language code (e.g. XML) in the screen components 402 of the application 105 associated with display of data on the device 100. The interaction of the Developer with the editor 708 can be assisted or otherwise driven by the screen patterns 656 (see FIG. 13), which can include patterns 656 such as but not limited to slide show 656a, form 656b, access device data 656c, conditional screen controls 656d and data sheet 656e, as further described below. UI controls for inclusion in the screen components 402 can be dropped onto a form canvas (not shown) in the editor section 232 of the display (see FIG. 20b). Control properties including event handlers can also be edited by the screen editor 708.

Example commands editable by the screen editor 708 can include commands such as but not limited to: ButtonChange which is sent (to the data model 608) when the developer changes a button control, this command triggers NavigationControlChange of the data model 608 if successful; MenuItemChange which is sent when the developer changes a menu item, this command triggers NavigationControlChanged of the data model 608 if successful; ChangeScript which is sent when the developer changes a script, this command triggers NavigationControlChanged of the data model 608 if successful; QueryMessages which is sent when the developer needs a list of available messages that screen of the application 105 may send or refresh on, and returns a list of available messages; QueryData which is sent when the developer needs a list of available data objects to bind controls to, and returns a list of available data; NonNavigationControlChange which is sent when a control that does not affect navigation (e.g. label, text field) has been modified; and DataBindingChange which is sent when a databinding has changed, this command triggers DataBindingChanged and ScreenParameterListChanged of the data model 608 if successful. Example input events of the screen editor 708 can include events such as but not limited to: ComponentRemoved whereby the screen developer (user of the tool 116) checks to see if the component is a message the associated screen component 402 is using for navigation, a Data object that the screen component 402 has controls bound to or a script (e.g. workflow component 406) that handles a screen event of the screen component 402; ComponentRenamed has the same interest as ComponentRemoved; ScreenParameterListChanged modifies the screen component 402 such as if a parameter that was in use has been changed, the screen component 402 must either adjust that parameter or warn the developer that those dependencies are no longer valid and must be changed; MessageFieldChanged whereby the Screen developer checks to see if the field in question is in use by the screen component 402; and DataFieldChanged whereby the Screen developer checks to see if any controls were bound to the field(s) that have changed and warns the developer appropriately.

An example interface of the screen editor 708 extends org.eclipse.ui.editors of the Eclipse framework using the GEF GraphicalEditor and/or a VE editor. The tool 116 coordinates the creation and/or modification of screen definitions in the (e.g. screen 402) components as well as the inter-relation of the created/modified screen definitions (and associated data definitions) affecting other associated components of the application 105.

Data Editor 710

The data editor 710 is responsible for facilitating the user of the tool 116 to create and modify the structured definition language code (e.g. XML) in the data components 400 (and possibly screen 402 and message 404 components) of the application 105 by providing the developer the ability to edit a Data Component 400 fields and properties. The interaction of the Developer with the editor 710 can be assisted or otherwise driven in connection with patterns 684 (see FIG. 13) that include a data component 400 aspect, as further described below. New Data objects can be created from scratch, by prototyping existing Data objects or based on data definition mappings to Message objects in message components 404.

Example commands editable by the data editor 710 can include commands such as but not limited to: AddRemoveFields which is sent when the developer adds or removes a field from a Data object definition, this command triggers DataFieldChanged of the data model 608 if successful; LinkToExternalData which is sent when the developer links a data object definition to an external (to the application 105) Data object, such as but not limited to a Calendar or Contacts data object, this command triggers DataFieldChanged of the data model 608 if successful.

Example input events of the data editor 710 can include events such as but not limited to: ComponentRemoved whereby the screen developer (user of the tool 116) checks to see if the object that was removed was related to the message through prototyping or containment, then the developer can adjust the fields contained in the Data object affected; and ComponentRenamed has the same interest as in ComponentRemoved.

An example interface of the screen editor 708 extends org.eclipse.ui.editors using the GEF GraphicalEditor. The tool 116 coordinates the creation and/or modification of data definitions in the (e.g. data 400) components as well as the inter-relation of the created/modified data definitions (and associated screen/message definitions) affecting other associated components of the application 105.

Message Editor 712

The message editor 712 is responsible for facilitating the user of the tool 116 to create and modify the structured definition language code (e.g. XML) in the message components 404 of the application 105. The interaction of the Developer with the editor 712 can be assisted or otherwise driven by the screen patterns 658 (see FIG. 13), which can include patterns 658 such as but not limited to message content target 658*a* and notification builder 658*b*, as further described below. The message designer provides for the developer to create and edit component messages that are sent to and arrive from the backend data sources 106 (in relation to the device 100). These messages can include both request/response pairs as well as subscribe/notify/unsubscribe notification messages. Message definitions can be created by prototyping existing messages or by templating based on back-end services of the data sources 106 such as WSDL and JDBC/SQL.

Example commands editable by the message editor 712 can include commands such as but not limited to: AddRemoveFields which is sent when the developer adds or removes field from a
message in a message component 404. Example input events of the message editor 712 can include events such as but not limited to: ComponentRemoved whereby the screen developer (user of the tool 116) checks to see if a message that this message definition prototypes or contains has been removed, then the view must be updated; ComponentRenamed has the same interest as ComponentRemoved; and FieldMappingChanged whereby the screen developer (user of the tool 116) checks to see if the field mapping effects the message definitions being edited, then the Message developer checks to see if any message fields have been added/removed/renamed by the change in the mapping.

An example interface of the screen editor 708 extends org.eclipse.ui.editors using the GEF GraphicalEditor. The tool 116 coordinates the creation and/or modification of message definitions in the (e.g. message 404) components as well as the inter-relation of the created/modified message affecting other associated components of the application 105.

Workflow Editor 702

The workflow editor 702 is responsible for facilitating the user of the tool 116 to create and modify the command code (e.g. ECMA Script) in the workflow components 406 of the application 105. The interaction of the Developer with the editor 702 can be assisted or otherwise driven by the patterns 648 (see FIG. 13) that are associated with application workflow configuration, as further described below. The workflow editor 702 defines the screen-to-screen transitions that form the core of the visual part of the component application 105. Screens and transitions between screens due to user/script events are rendered visually.

Example commands editable by the workflow editor 702 can include commands such as but not limited to: QueryScreens which is sent when the developer wants a list of screens to select from, such as when adding a new screen to the workflow; QueryScripts which is sent when the developer wants a list of scripts to call on a screen navigation event; QueryArrivingMessages which is sent when the developer wants a list of response messages (including notifications) on which to key screen transitions; AddComponent which is sent when the developer wants to add a new screen, message or script to the workflow that doesn't already exist in the workflow, this command triggers ComponentAdded of the data model 608 if successful; and ChangeNavigation which is sent when the developer adds a new navigation to the workflow, this command triggers NavigationChanged of the data model 608 if successful.

Example input events of the workflow editor 702 can include events such as but not limited to: ComponentRemoved whereby the workflow developer (user of the tool 116) checks to see if the component is a workflow object (Screen, Script, Arriving Message), then the Workflow updates itself by deleting all relationships with this object definition; ComponentRenamed whereby the workflow developer (user of the tool 116) checks to see if the component is a workflow object, then the workflow updates its visual with the new name of the component; NavigationControlChanged whereby the workflow developer (user of the tool 116) checks to see if the workflow must update its view of the navigation based on the control change, if for example a button has been added to a screen in the workflow, then the view is updated to show the availability of a new navigation node on that screen; ScreenParameterListChanged whereby the workflow developer (user of the tool 116) checks to see if a screen's parameter list has changed and that screen is in the workflow, then the developer updates the view of any navigation involving that screen; NavigationChanged whereby the workflow developer (user of the tool 116) checks to see if a possible navigation change has occurred, the developer finds and parses the change and makes any necessary updates to the view; and ExitCodeChanged whereby the workflow developer (user of the tool 116) checks to see if an exit point has been added/removed, then editor view is updated to reflect this visually. An example interface of the screen editor 708 extends org.eclipse.ui.editors using the GEF GraphicalEditor.

Message-Data Relationship Editor 704

The message editor 704 is responsible for facilitating the user of the tool 116 to create and modify the structured definition language code (e.g. XML) in the inter-related message 404 and data 400 components of the application 105. The interaction of the Developer with the editor 704 can be assisted or otherwise driven by the patterns 648 (see FIG. 13) that are associated with message-data relationship configuration, as further described below. The message/data relationship editor 704 creates and edits relationships between Message Components 404 and Data Components 400. These mappings effect how a Data Component 400 is populated on Message arrival to the device 100 when running the application 105. For example, data object definitions common between data 400 and message 404 components can be such that the data object definitions can be resident in the data component 400, while a only data mapping definition (stating where the data object definition(s) can be found) linking the message component 404 to the data object definition in the data component 400 can be resident in the message component 404, or vice versa. A similar configuration can be employed for data object definitions common between screen 402 and data 400 components, whereby the data object definition is resident in one of the components and the data mapping definition is resident in the other associated component, as further described below in relation to the screen-data relationship viewer 804 (see FIG. 8).

Example commands editable by the editor 704 can include commands such as but not limited to: AddComponent which is sent when the user adds a new Data or Message to the relationship diagram with the effect of also adding that component to the application 105 being developed, this command triggers ComponentAdded of the data model 608 if successful; QueryMessages which is sent when the developer needs a list of Messages to map; QueryData which is sent when the developer needs a list of Data to map; ChangeMessageLevelMapping which is sent when the developer changes a message level mapping, this command triggers FieldMappingChanged of the data model 608 if successful; ChangeFieldLevelMapping which is sent when the developer changes a field level mapping, this command triggers FieldMappingChanged of the data model 608 if successful; ChangePrototype which is sent when the developer changes (adds/removes) a prototype relationship between Data objects, this command triggers FieldMappingChanged of the data model 608 if successful; and ChangeContainment which is sent when the developer changes a containment relationship between Data objects, this command triggers MessageContainmentChanged of the data model 608 if successful.

Example input events of the editor 704 can include events such as but not limited to: ComponentRemoved whereby the developer (user of the tool 116) checks to see if the object removed was a Message or Data, the relationship mapper deletes any relationships involving the removed object; ComponentRenamed whereby the developer (user of the tool 116) checks to see if the renamed object is involved in any mapping relationships, the visual representation of the mapped object is updated with the new name; MessageFieldChanged whereby the developer (user of the tool 116) checks to see if the message concerned is present in the relationship editor, then field change is reflected in the visual representation of the message, if the field in question is involved in a mapping, then changes are reflected and the developer may need to be warned of broken mappings (if for example, a field has been removed); and DataFieldChanged has the same interest as MessageFieldChanged except with Data instead of Messages.

An example interface of the editor 704 extends org.eclipse.ui.editors using the GEF GraphicalEditor. The tool 116 coordinates the creation and/or modification of message/data definitions in the (e.g. message/data 404/400) components as well as the inter-relation of the created/modified message/data definitions affecting other associated components of the application 105.

Localization Editor 714

The localization editor 714 provides for the developer to collect all strings that will be visible to the application 105 end-user (of the device 100) and edit them in one place. The editor 714 also provides for the developer to create multiple resource mappings for each string into different languages. Example commands editable by the editor 714 can include a command such as but not limited to: ChangeLocalizeString which is sent when the developer adds, deletes or modifies a localized string. An example input event of the editor 714 can include an event such as but not limited to: LocalizedStringChanged which is used to determine when a string literal has been changed in the script editor or a label has been changed in the screen editor 708. The Localization Editor 714 can extend the org.eclipse.ui.editors interface by extending an EditorPart.

Backend Visualizer Editor 716

The backend visualizer 716 shows the developer the relationships between Message Components 404 and the backend data sources 106 (web services, SQL etc.—see FIG. 1) that drive the components 404. The interaction of the Developer with the editor 716 can be assisted or otherwise driven by the patterns 648 (see FIG. 13) that are associated with message and/or data relationship configuration between the device runtime RE (see FIG. 1) and the backend data sources 106, as further described below. The editor 716 also provides for the developer to add new sources 106 to the list of those supported by the application 105 in development. In addition to interaction with the design time data model 608, as is described for other modules 601 using commands and events received, the Backend Visualizer editor 716 collaborates with the Backend Connector 616 (see FIG. 6). The Backend Connector 616 provides for the visualizer to request a Services-Interface from a registry of known service types (e.g. Web Services, SQL Databases). A list of Services of this type is returned that can queried by name or by iteration.

Example commands editable by the editor 716 can include commands such as but not limited to: AddComponent which is sent when the developer adds a new message, this command triggers ComponentAdded of the data model 608 if successful; and SpecifyMapping which is sent when the developer connects a message to a selected backend data source 106. Example input events of the editor 716 can include events such as but not limited to: ComponentRemoved whereby the developer (user of the tool 116) checks to see if the component is a message, the backend visualizer adjusts its mappings for that message; ComponentRenamed has the same interest as ComponentRemoved; and MessageFieldChanged whereby the developer (user of the tool 116) validates the message field against what exists on the backend and visually notifies of any broken mappings. Backend data sources 106 are accessed through direct calls to the service layers. Optionally, background processing may be used to keep network processing from blocking UI threads. The Editor 716 can extend the org.eclipse.ui.editors using the GEF GraphicalEditor.

Viewers 602

Referring to FIGS. 6 and 8, viewers 602 are modules 601 that commit their changes to the data model 608 as soon as the developer makes them. Referring to FIG. 8, the distribution of viewers 602 in to Eclipse plug-ins (by way of example only) is shown. Tool viewers 602 fall broadly into two categories, such as but not limited to the catgories of: Resource viewers 810 and Graphical Editing Framework (GEF) viewers 808, which provide an edit space in which to view objects. The user can view nodes (entities) and connections (relationships) between them, so as to for example define the content and inter-relationships of the XML coding of the components 400, 402, 404, 406 (see FIG. 4). It is recognised that the viewers 602 are used to create and modify definitions contained in the components 400,402,404,406 s well as to create and modify the interdependancies of the definitions between the components (e.g. data-data, data-screen, message-data, screen-data, data-message) as further discussed below. The Eclipse viewers are modules 601 that commit changes to the data model 608 as soon as the user makes one. The Viewers 602 include: the Navigator 802 which shows a hierarchical view of the application 105 projects in the workspace of the display 206 (see FIG. 2) realized by a tree view (for example);

a Testing/Preview viewer 806 that emulates the runtime behaviour of the application 105 and the Screen-Data Relationship viewer 804 that can be a read-only view of the relationships between a screen 402 and the data 400 components that are bound to the respective screens. Each viewer 602 can create an extension point at org.eclipse.ui.views and can implement the IViewPart interface of the Eclipse platform, usually through a selected default super-class.

Navigator Viewer 802

The Navigator 802 provides the developer with a hierarchical tree view (for example) of all the project applications 105, folders and files in the workspace of the display 206. The developer can browse and manipulate the objects definitions associated with the selected application 105 project from the Navigator 802.

Example commands by the viewer 802 can include commands such as but not limited to: AddComponent which is sent when a new component is added to the application 105 project through a New menu on a navigator context menu (not shown), this command triggers ComponentAdded of the data model 608 if successful; RemoveComponent which is sent when a component is removed by deleting it from the navigator context menu, this command triggers ComponentRemoved of the data model 608 if successful and RenameComponent which is sent when a component is renamed by selecting it in the navigator, this command triggers ComponentRenamed of the data model 608 if successful.

Example input events of the viewer 802 can include events such as but not limited to: ComponentAdded for when a component is added, the navigator 802 refreshes its view of the project application 105 and ComponentRemoved has the same interest as ComponentAdded. Example interfaces for the navigator viewer 802 is such that the viewer 802 extends the org.eclipse.ui.views extension by sub-classing org.eclipse.ui.views.navigator.ResourceNavigator, by example for the Eclipse framework.

Screen Data Relationship Viewer 804

The Screen/Data viewer 804 provides for the developer to view the relationships between a given screen definition and the Data definition that is bound to it. The interface can be read-only and is constructed from design time data contributed by the associated Screen 404 and Data 400 components. For a read only viewer 804, the viewer 804 does not have any commands that affect the data model 608. Example input events of the viewer 804 can include events such as but not limited to: ComponentRemoved whereby the developer (user of the tool 116) checks to see if the component removed is a Screen 402 or Data 400 component, the developer removes any relationships with the removed component; DataBindingChanged whereby the developer (user of the tool 116) checks to see if the component is a Screen 402 or a Data 400 component and is currently open in the viewer 804, then the name of the component is updated and ComponentRenamed whereby the developer (user of the tool 116) checks to see if the DataBinding involves a Screen 402 and/or Data 400 components that are currently open, then any new relationships are depicted in the view of the display 206 (see FIG. 2). The viewer 804 can extend org.eclipse.ui.editors using the GEF GraphicalEditor, but as a "read-only" editor view.

Testing/Preview Viewer 806

The Testing/Preview viewer 806 emulates the runtime behavior of the application 105 outside of the device 100 (on the designer's computer 201—see FIG. 2). The viewer 806 interacts with: the Skin Manager 618 of the service layer 614 (see FIG. 6) such that a collection of skin plug-ins are managed for the emulated device 100; the Runtime Data Model 610 that models the properties and state of the emulated application 105 and the Design Time Data Model 608 that provides the metadata for the emulated application 105, such as what visual elements exist on a screen and how they are to be laid out.

Referring to FIGS. 1 and 9, a method 900 is shown for developing the application 105 having component 2 400,402, 404 with descriptors expressed in a structured definition language and component 406 expressed as a series of instructions. It is recognised that individual components 400,402, 404, 406 interact for processing messages on the runtime environment RE of the device 100 that are received from the datasource 106 over the network 10. In constructing the application 105, the definitions of the components 400,402,404 are developed 902 through interaction with the data model 608, the model 608 for providing a persistent state of the application. The instructions of the second component are developed 904 through interaction with the data model 608. Message mapping information of the data source 106 selected for the application 105 is obtained 906 for assisting in the generation of the definitions based on the mapping information. Once completed, the components 400,402,404,406 are assembled 908 into the application 105.

Application Development Patterns 648

Recommendation Patterns 654

Figure 13:
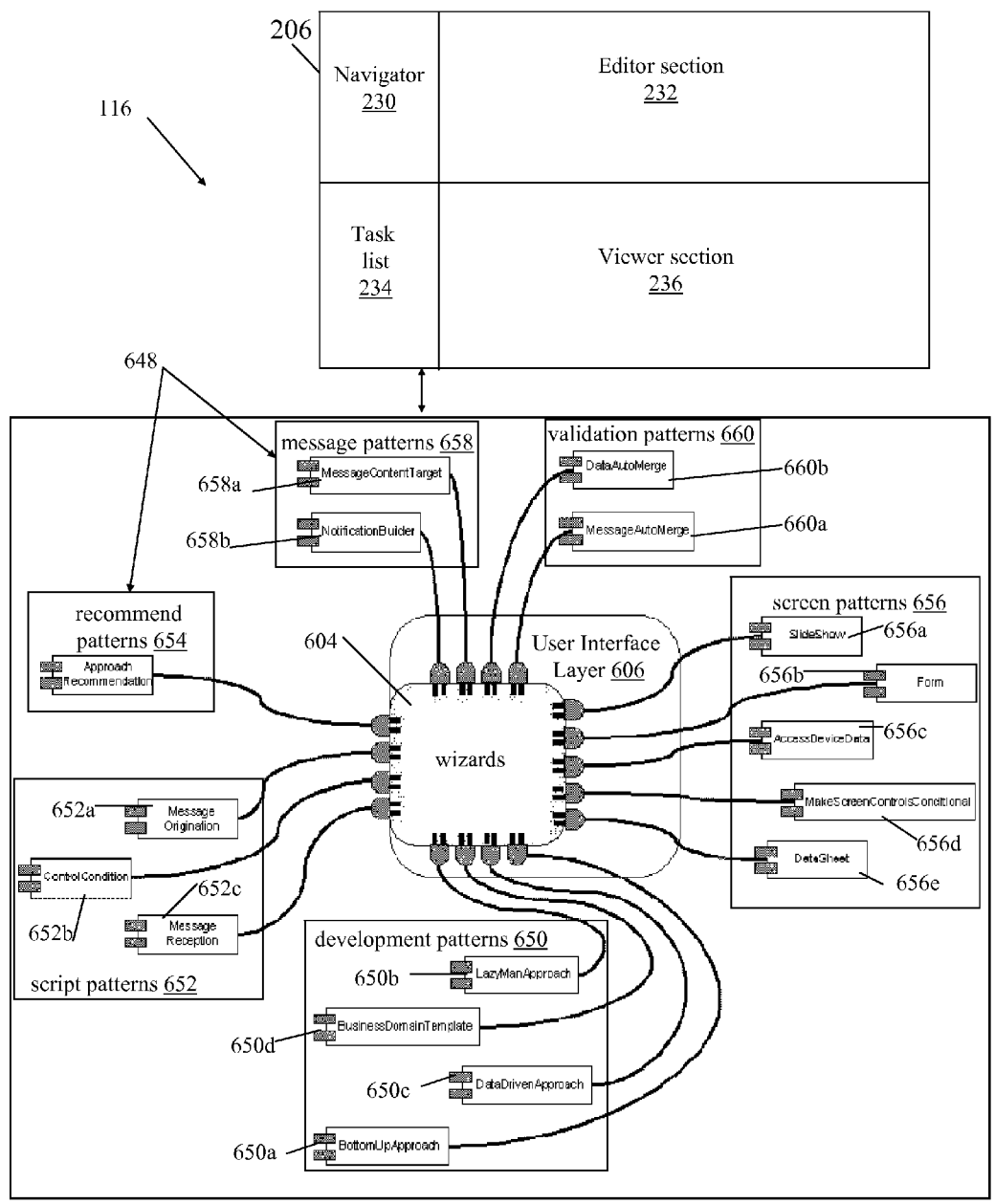
FIG. 13 shows wizards of the tool of FIG. 6.
Figure 14:
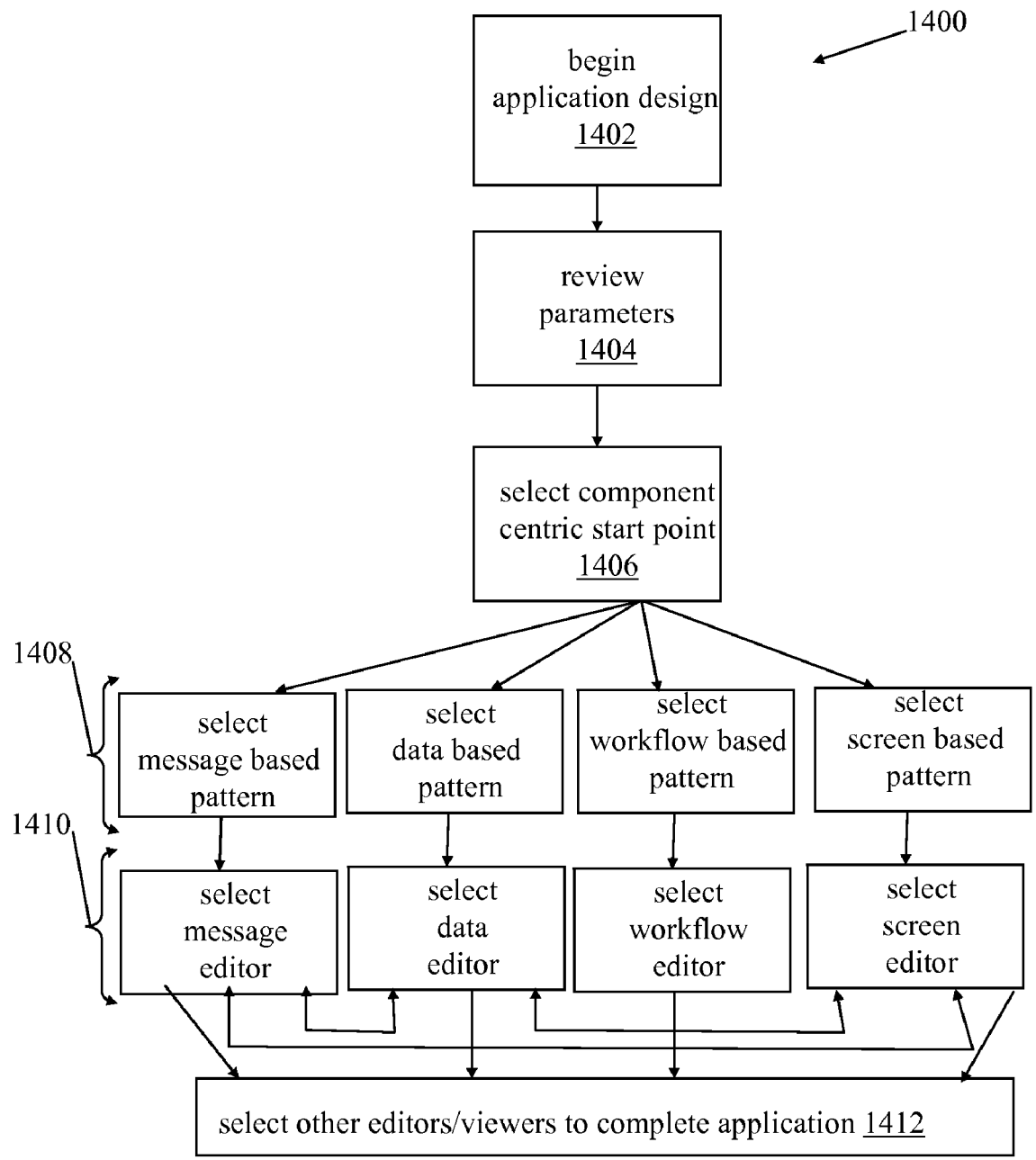
FIG. 14 shows an example operation of the wizard patterns of FIG. 13.

Referring to FIGS. 13 and 14, the tool 116 can use the Approach Recommendation pattern 654 presented on the display 206 (see FIG. 2) as a wizard 604 in order to guide the developer to determine which of the available development approach patterns 650 are best suited to the current development activity. As noted above, the wizard 604 operation is guided through the dialogs 605 accessed through the user interface 202 of the tool 116. For example, the developer is faced with the initial problem of how to decide which approach pattern 650 to take when developing the application 105. Referring to FIG. 14, the developer starts 1402, or otherwise continues an existing application 105 project, by considering some issues that may effect the pattern 650 selected, issues such as but not limited to: limitation to a framework of existing elements such as web services, prior applications, current database configuration or some combination of these elements. The developer then reviews 1404 design parameters that may factor in to the approach pattern 650 selection, which can include parameters such as but not limited to: there is an existing application operation with well understood workflow and/or screens that are required to be emulated by the application 105; there may be a specific datasource 106 that will be connected on the backend, and it is desired to model the application 105 based on this specific datasource 106 schema; there may be an existing web service (datasource 106) that the application should interact with and accordingly no changes may be made to the behaviour of that web service (datasource 106); and the application 105 may be a simple test of the web service or may generate a simple form based interface. These design parameters can be suggested by the pattern 654 to the developer via the display 206 as desired.

Based on a decision 1404 of which component(s) 400,402, 404,406 are central to the development approach patterns 650, the recommendation pattern 654 can select 1406 automatically (communicated to the developer via the display 206) which of the patterns such as but not limited to: a bottom-up pattern 650a that is message component 404 centric; a lazy man pattern 650b that is message component 404 centric; a data driven approach 650c that is data component 400 centric; and a business domain template pattern 650d that is data component 400 centric, as further described below. It is also recognised that the developer could not use the recommendation pattern 654 and instead manually select 1406 which of the development approach patterns 650 to start with. Further, it is recognised that other development patterns 650 could be screen component 402 and/or workflow component 406 centric, as desired. Further, it is recognised that there may be situations in which more than one component 400,402,404, 406 can be selected as a starting point for application development purposes, based on the step 1404 However, in this case, a specific editor 600 or viewer 602 associated with one of the selected components 400,402,404,406 could be selected (either manually or automatically) as a module 601 to start the development process.

Referring again to FIG. 14, if the pattern 650 decision at step 1406 is, for example, that there is an existing web service (data source 106) that is available, and the application 105 is restricted to employ the corresponding Web Services interface, then a message component 404 centric approach can be taken at step 1408, referred to as the "Bottom Up Approach" pattern 650a. An extreme case of this situation, in which the developer cares little about how the application looks, may allow the use of the Lazy Man Approach pattern 650c which is also message component 404 centric. On the other hand, if at step 1406 the developer has the application 105 development task that closely mirrors an existing datasource schema, the Data Driven Approach pattern 650c can be selected 1408 which is data component 400 centric. Similarly, a standard set of data components 400 that model a particular business domain may be the reason for selecting 1408 the business domain template pattern 650d, also data component 400 centric. Accordingly, the particular development patterns 650, either the above described or others as desired, can be selected according to component 400,402,404,406 centric reasoning.

Development Patterns 650

BottomUpApproach Pattern 650a

Referring to FIGS. 13 and 14, the Bottom Up Approach pattern 650a takes the approach of generating the suitable application 105 based on available backend datasource 106 messaging description (e.g. SQL and WSDL). Included in this pattern selection 650a are the issues of: how you do intelligently and efficiently build the application 105 that works to an existing Web Service or other datasource 106 service; and are one or more existing backend datasource 106 services that the developed application 105 must address or otherwise communicate with. Example design parameters for consideration are: a typical corporation has its legacy set of available services of the datasource 106 and a set of public Web Services available via the internet may be the framework for the application 105. Accordingly, the above details and decisions could be displayed to the developer via the display 206 or could be decided upon manually by the developer. Based on the above, the pattern 650a could direct the developer (via the display 206 or other means of the user interface 202) to:

1. Select the message editor 712 (and associated message related wizards 604 at step 1408) (see FIG. 7) at step 1410 for assembling a message component 404;

2. Enter the URL of the target Web Service;

3. Pick operation to generate messages of the message editor 712;

4. Select field default values;

5. Acknowledge recommendations for message duplication generated by the MessageAutomerge pattern 660b (further discussed below), for example using the model validator 602 (see FIG. 6);

6. The MessageContentTarget pattern 658a (further discussed below) may be applied if the developer wants to generate a suitable data component 400 to persist the message data of the message component 404, or link the message of the message component 404 to a screen defined in a screen component 402; and 8. The development of the application can be completed 1412 by specifying any additional data 400, screens 402, and workflow 406 (e.g. navigation) components using associated editors 600 and viewers 602 with related wizards 604 as further described below. This can be accomplished by going directly to step 1412 or by crossing the paths of step 1408 under direction of the appropriate wizard 604 (indicated symbolically by reference numerals 1409).

Lazy Man Approach Pattern 650b

Referring to FIGS. 13 and 14, the Lazy Man Approach pattern 650b can be an extension of the Bottom Up Approach pattern 650a, whereby the entire application 6105 is generated including data components 400 and screen components 402. Included in this pattern selection 650b are the issues of: how do you efficiently generate the application 105 to be able to test an existing Web Service data source 106; and you are in the early stages of development and your target Web Service datasource 106 is changing the messaging schema frequently, for example you want to be able to quickly generate the application 105 to test the interface and are not really concerned about the presentation of the application 105. Example design parameters for consideration are: the UI appearance of the application 105 may have little effect on ability to interact with the Web Service datasource 106; and the developer may be most concerned with testing and debugging of the backend datasource 106. Based on the above, the pattern 650b could direct the developer (via the display 206 or other means of the user interface 202) to:

1. start with the Bottom Up Approach pattern 650a, which is applied at step 1408 and extended;

2. in conjunction with the data editor 710 (and potentially editor 704) at step 1410 and if desirable 1409 the pattern 650b provides a set of suggested data components 400 to model data passed or returned from message invocations of the message components 404;

3. a set of default screens to present or enter data passed to the Web Service is generated by the screen editor 708 and potentially viewer 804) and accepted; and 4. The development of the application 105 can be completed 1412 by specifying any additional data 400, screens 402, and workflow 406 (e.g. navigation) components using associated editors 600 and viewers 602 with related wizards 604 as further described below. This can be accomplished by going directly to step 1412 or by crossing the paths of step 1408 under direction of the appropriate wizard 604 (indicated symbolically by reference numerals 1409).

Data Driven Approach Pattern 650c

Referring to FIGS. 13 and 14, the Data Driven Approach pattern 650c assists the developer to create the application 105 using the tool 116 that closely resembles or is otherwise similar to an existing database schema. Included in this pattern selection 650c are the issues of: how do you produce the application 105 that takes its structure primarily from an existing datasource 106 model; the target application data structure is to closely/identically resemble a portion of the datasource 106 schema; and the application 105 is used primarily to view or update information being stored in the backend datasource 106. Example design parameters for consideration are: the application 105 is data centric and the functionality of the application 105 behaves in a simple view/update/delete mode. Based on the above, the pattern 650c could direct the developer (via the display 206 or other means of the user interface 202) to, by way of example only:

1. Select the data editor 710 at step 1410 (and associated data related wizards 604) at step 1408;
2. Select to generate the data components 400 according to the database schema using the editor 712 (and potentially editor 704);
3. Provide the location of the database schema (e.g. may be expressed through a ddl file);
4. Suggesting matching data components 400 to "cache" data expressed through the tables as per the previous step;
5. The developer may select a subset of the available tables such that the tool 116 maintains the minimum (or other predefined criteria) dependent relation set for associated required tables;
6. The user may specify how the table is accessed, e.g. select/update/delete, and suggested messages may be generated by the message editor 712 to support these functions; and
7. The application is completed 1412 by providing the messaging components 400 to perform interaction with the datasource 106 using the message editor 712 (assuming step 6. was skipped), and providing screen components 402 to visualize and manipulate the data components 400 by employing at step 1412 appropriate screen editors 708 and viewers 804 with related wizards 604 where provided by the tool 116.

BusinessDomainTemplate Pattern 650*d*

Referring to FIGS. 13 and 14, the BusinessDomainTemplate pattern 650*d* may be used to assist the developer as part of the primary approaches to generate a standard set of data components 400 that model a particular business domain for the application 105. Included in this pattern selection 650*d* are the issues of: how do you produce the application 105 that is best suited for a particular vertical market place; and you are developing the application 105 for a particular domain of business applications, e.g. insurance, health sector, real estate, auto industry etc. Example design parameters for consideration are: business sectors typically have their own well defined entities and relationships; the developer wants to make sure that the application 105 is familiar to the domain user; desire to avoid "reinventing the wheel"; and desire to make sure the application 105 adheres to accepted conventions. Based on the above, the pattern 650*d* could direct the developer (via the display 206 or other means of the user interface 202) to, by way of example only:

1. The business domain template pattern 650*d* (e.g. wizard) is invoked 1408 on the display 206 by the developer using the UI 202, and the schema (XSD) location for the business domain is provided;
2. the tool 116 generates a set of data components 400 matching the business domain through using the data editor 710 at step 1410;
3. the developer may select the objects of the schema that are of interest, discard those that are not used (typical domain schemas are quite large);
4. the tool 116 maintains relationships between connected data expressions in the schema to make sure that all dependent components 400 are included; and
5. the application 105 is completed 1412 by providing the messaging components 400 to perform interaction with the datasource 106 using the message editor and providing screen components 402 to visualize and manipulate the data components 400 by employing at step 1412 appropriate screen editors 708 and viewers 804 with related wizards 604 where provided by the tool 116.

It is recognised that use of other editors 600 and viewers 602, other than those described above by way of example only, may be directed by the wizard 604 for the respective pattern 650*a,b,c,d* as required. This includes interaction between wizards 604 and associated patterns 648 as preferably directed through the wizard 604 for the resective pattern 650*a,b,c,d* as displayed to the developer on the display 206 (or otherwise through the user interface 202).

Validation Patterns 660

Message Automerge Pattern 660*a*

An MessageAutomerge pattern 660*a* is a refinement pattern that may reduce duplication in definition of messages of message components 404 exchanged with the backend datasource 106. This pattern 660*a* can be implemented on the display 206 when the validator 620 (see FIG. 6) is invoked for validation purposes of the application 105, as a consequence of developer input events on the UI 202. Included in this pattern selection 660*a* are the issues of: how do you generate the most efficient set of messages to interact with the backend Web Service; and you are developing the application 105 using the Bottom Up Approach pattern 650*a* and have generated a set of messages for a particular web service (data source 106). Example design parameters for consideration are: some interfaces may exchange similar or duplicate sets of parameters; and every duplicate specification has an associated (and unnecessary) cost in terms of application 105 size, over the air transmission overhead, on device runtime RE requirements. Based on the above, the pattern 660*a* could direct the developer (via the display 206 or other means of the user interface 202) to, by way of example only:

1. the set of generated messages (of the message component 404 by the message editor 712 for example) is provided by (for example) by the Bottom Up Approach pattern 650*a* as described above;
2. the messages are analyzed to see if there is commonality in terms of the messages, e.g. one message is a subset of another (comparison if field numbers & types) and/or any duplicate message definitions;
3. the tool 116 makes recommendations where prototyping may be used to define similar messages by inheritance, or where duplicate messages may be eliminated.

DataAutomerge Pattern 660*b*

This pattern 660*b* is capable of providing the same sorts of optimizations and steps discussed for messages in the MessageAutomerge pattern 660*a* when applied to the set of Data component 400 specifications (by the data editor 710 for example) of the developed application 105.

Screen Patterns 656

Figure 15:
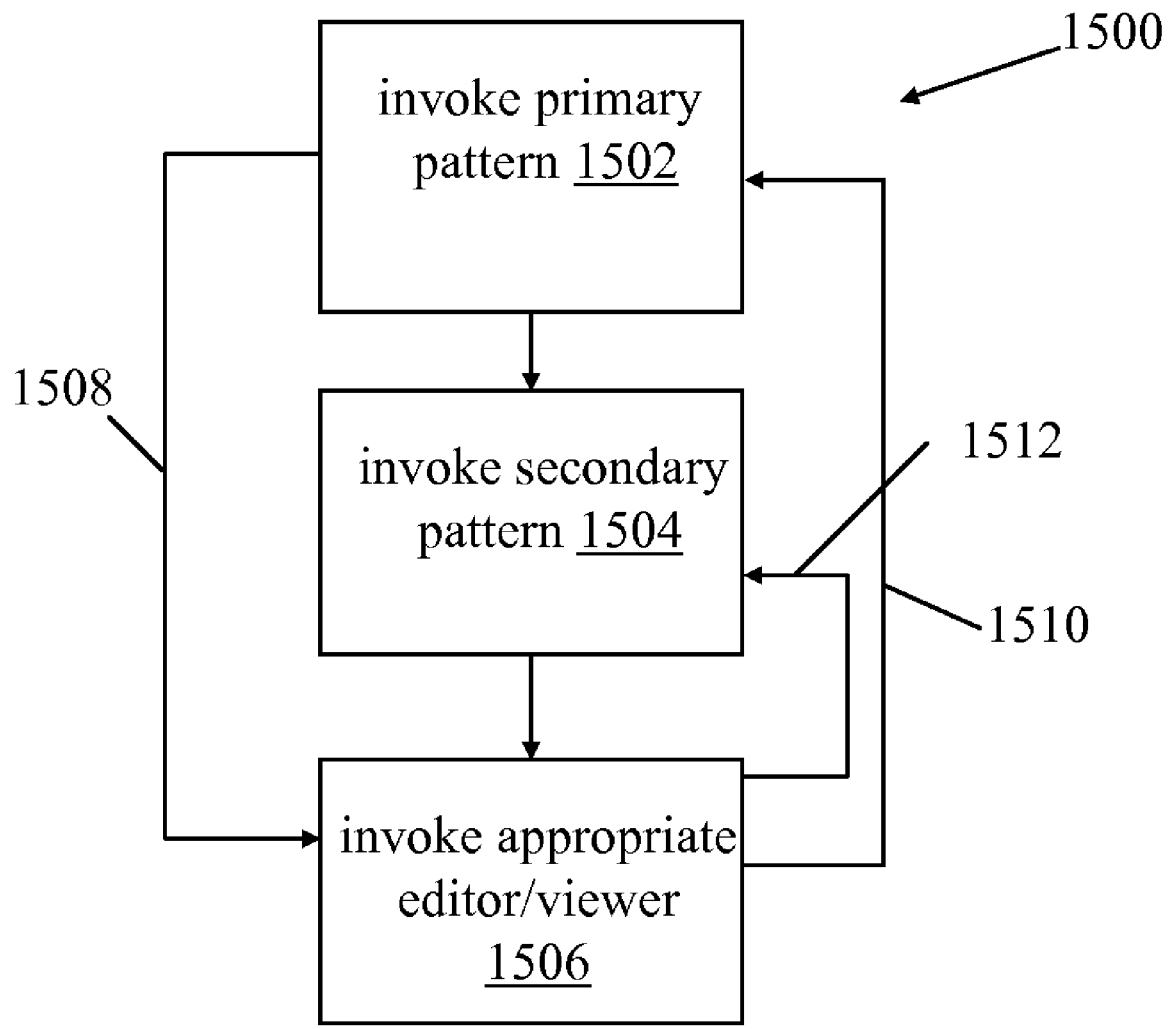
FIG. 15 is a further embodiment of the operation of FIG. 14.

Referring to FIG. 14, the screen patterns 656 can be applied at steps 1410 and/or 1412 as secondary patterns 648 to assist in generation of the screen components 402 according to the primary pattern 650 direction/coordination, i.e. pattern 650 drives pattern 656 that drives the operation of the screen editor/viewer 704,804 in assisting the developer in generation of the screen components 402 of the application 105. The coordination 1500 of primary and secondary patterns is shown in FIG. 15, where the primary pattern (for example pattern 650) is first invoked 1502 (for example by patterns 654). The primary pattern then invokes or otherwise selects 1504 the secondary pattern (for example patterns 652,656, 658,660) which in turn assist or otherwise invoke 1506 the appropriate editors 600 and viewers 602 for development of the components 400,402,404,406 as desired by the developer or otherwise directed by the patterns 652,656,658,660 (i.e. wizards 604). It is also recognised that the primary patterns could invoke 1508 directly the appropriate editors/viewers 600, 602 as desired. Also, once the secondary pattern has completed its direction of the associated editors/viewers 600, 602 in developing the corresponding components 400,402, 404,406 (i.e. the editor 712 being directed by the pattern 658 to construct the message component 404), direction can be handed back 1510 to the original primary pattern or to a different primary pattern or handed 1512 to other secondary pattern to continue the application 105 development.

Form Pattern 656b

The Form pattern 656b provides a way for the developer to efficiently generate a screen (as screen component(s)), using the screen editor 704 and viewer 804, that collects and submits some values. Included in this pattern selection 656b are the issues of: how do you efficiently produce a form to collect and submit some information; and the screen to be produced has a structured, such as a table based format. Example design parameters for consideration are: forms are frequently used to collect standard sets of information e.g. user details, preferences etc. Based on the above, the pattern 656b could direct the developer (via the display 206 or other means of the user interface 202) to, by way of example only:

1. the developer is prompted by the pattern 656b using the screen editor/viewer 704,804 for the number of columns that will appear in the form;
2. or each row that is to appear in the form;
   a. the developer identifies what type of control appears in each column e.g. label, editbox, image, etc such that the developer enters required text for any labels and identifies data mappings where appropriate;
3. the developer identifies how screen transition takes place via submission, e.g. submit by button, submit by menu item and applies MessageOrigination pattern 652a where appropriate; and
4. the screen component 402 development is completed (either in whole or in part) and subsequent editors/viewers 600,602 are either invoked directly or though subsequent wizards 604.

DataSheet Pattern 656e

The DataSheet pattern 656e provides a way to generate a screen that is based on a data definition of a data component 400, for example. Included in this pattern selection 656e are the issues of: how do you generate a screen that is based on an existing data definition; and when using this pattern 656e, the screen becomes a visual means to represent the data structure itself. Example design parameters for consideration are: some screens are generated just for the purpose of modifying a data component 400. Based on the above, the pattern 656e could direct the developer (via the display 206 or other means of the user interface 202) to, for example only:

1. using the screen editor/viewer 704,804 the developer provides the data component 400 definition from which the screen is to be generated;
2. the tool 116 generates a screen (using a screen component 402 and associated editor/viewer 600,602) having two columns; one column for the field names, another column for the field values, such that
   a. the control names may be automatically generated based on the data component 400 definition field names,
   b. the control type will be generated based on the data type where,
      i. simple fields are mapped to edit boxes, and
      ii. nested data fields produce an "Add", "Edit" and "Remove" buttons. The DataSheet pattern 656e is reapplied to generate the screen (screen component 402) that visualizes the nested data component 400 such that,
         I. presentation of the "Add", "Edit" and "Remove" buttons depend on runtime conditions (ie. Whether the nested component is null or not),
      iii. Nested array type fields generate a choice list such that,
         I. arrays of simple values can be represented directly by the choice list,
         II. arrays of components use the DataSheet pattern 656e to be reapplied for the contained datatype, and
         III. "Add", "Edit" and "Remove" buttons may be displayed based on runtime conditions,
            a. Add is always displayed,
               i. At runtime the "Add" button may open the dialog 605 to collect a simple value, or may transition the application 105 to a sub page to create the data component 400,
            b. Edit is displayed when a choice is made,
            c. Remove is displayed when a choice is made,
               i. Removal of data component 400 may prompt the user if they want to remove all nested data instances,
      iv. Fields having resource designation result in image field,
   c. The field labels should be entered by the developer,
   d. Any particular field may be skipped at the discretion of the developer,
3. the tool 116 generates a submit button that applies the values, and
4. the screen component 402 development is completed (either in whole or in part) and subsequent editors/viewers 600,602 are either invoked directly or though subsequent wizards 604.

SlideShow Pattern 656a

The SlideShow pattern 656a generates a screen (i.e screen component 402) that visualizes a dynamic set of images. Included in this pattern selection 656a are the issues of: how do you effectively show a series of images where the number of images is dynamic so cannot be determined at design time; and the application 105 relies on a dynamic set of URLS that may point to different images based on some prior conditions. Example design parameters for consideration are: it is difficult and time consuming to produce the screen and script that allows for this behaviour. Based on the above, the pattern 656a could direct the developer (via the display 206 or other means of the user interface 202) to, by way of example only:

1. using the screen editor/viewer 704,804 the developer identifies the source of the URLS (from array)
   a. May be an array field on the data component 400,
   b. May be an array field on a received message;
2. the tool 116 generates a basic screen (component 402) having an image control mapped to a global variable
   a. the tool 116 generates the global variable;
3. the tool 116 generates a "next" button
   a. an attached script component 406 is generated that loads the global variable of 2.a with the next image URL from 1;
4. the tool generates a "done" button; and
5. the screen component 402 development is completed (either in whole or in part) and subsequent editors/viewers 600,602 are either invoked directly or though subsequent wizards 604.

Access Device Data Pattern 656c

The Access Device Data pattern 656c provides intelligent handling of access to "built-in" collections based on device access (e.g. Calendar appointments, Addressbook entries etc.). The pattern 656c provides a means to distinguish between the entire collection of components as managed by the device 100, and a subset of components created and managed by the application 105. Included in this pattern selection 656c are the issues of: how do you easily distinguish between use of the entire device 100 managed collection of external components, versus just the subset of components on which the application 100 operates; and you are developing the screen component 402 that makes reference to an external collection such as calendar appointments. Example design parameters for consideration are: some applications 105 may want to operate on all the external collection entities managed by the external application; some applications 105 may want to show only external application components that are created and managed by the itself. Based on the above, the pattern 656c could direct the developer (via the display 206 or other means of the user interface 202) to, by way of example only:

1. using the screen editor/viewer 704,804 the developer links a control to a "built-in" collection such as Calendar or Addressbook;
2. the developer indicates the containment relationship for the built-in collection
   a. the collection can include all references created and managed externally by the accessed application
   b. the collection can include only those components created or referenced explicitly by the application;
3. the tool 116 generates the data component 400 for the situation indicated in 2
   a. For standard collection of components, the application 105 data component 400 simply uses the built-in component by name e.g. "Address",
   b. For the application 105 managed collection, the application data component 400 extends the built-in component and adds a UID key field,
      i. The extended data component 400 is given a hidden name, possibly by pre-pending the application 105 name to the collection name,
      ii. the tool 116 then uses this hidden name when generation of the screen occurs, but continues to use the built-in collection name in the design views of the tool 116,
      iii. the tool 116 maintains relationship to the correct underlying type when data is passed to a script or another screen component 406,402; and
4. the screen component 402 development is completed (either in whole or in part) and subsequent editors/viewers 600,602 are either invoked directly or though subsequent wizards 604.

Supporting Code:
The built-in collection may be extended as follows to allow application 105 managed collections:

```
<data name="[wicletName]Address" prototype="[UIDpkg]" pkey="UID">
<dfield name="UID" type=.../>
</data>
```

Make Screen Controls Conditional Pattern 656d

The Make ScreenControls Conditional pattern 656d allows the developer to attach a condition to a screen control that specifies the criteria by which visibility is determined. Included in this pattern selection 656d are the issues of: how do you specify that a particular control may only be shown under certain circumstances; how can you write the application 105 in such a way that as little navigation logic as possible is embedded into the script components 406, and is rather expressed in the screen definition; and you are developing the application 105 that has navigation or message sending that is conditional on some testable criteria. Example design parameters for consideration are: it is desirable to shift conditional logic for navigation from the scripts into the definitions of the screen component 402; and you want to take full advantage of other helper patterns such as the Message-Origination pattern 652a (for example). Based on the above, the pattern 656d could direct the developer (via the display 206 or other means of the user interface 202) to, by way of example only:

1. using the screen editor/viewer 704,804 the developer indicates that a particular control is subject to conditional logic;
2. the tool 116 presents an area whereby the condition may be stated
   a. prior conditions generated are displayed for reuse;
3. the tool 116 associates the condition to the control and prompts whether other patterns such as Message Origination 652a are to be applied; and
4. the screen component 402 development is completed (either in whole or in part) and subsequent editors/viewers 600,602 are either invoked directly or though subsequent wizards 604.

Supporting Code:
Consider the Following Two Examples:

```
Example A: (Correct Approach):
<screen name="fromScreen">
<button name="submitToScreenA" condition="return User.selection == "A">
<event script="sendMsgAGotoA" param="aType"/>
</button>
<button name="submitToScreenB" condition="return !User.selection == "A">
<event script="sendMsgBGotoB" param="bType"/>
</button>
</screen>
<script name="sendMsgAGotoA" params="a">
A.send(a);
ScrA.display( );
</script>
<script name="sendMsgBGotoB" params="b">
B.send(b)
ScrB.display( );
</script>
Example B: (Incorrect Approach)
<screen name="fromScreen">
<button name="submitToScreenAOrB">
<event script="sendAndBranchAOrB" param="aType, bType"/>
</button>
</screen>
<script name=" sendAndBranchAOrB" params="a,b">
if(User.selection == "A") {
A.send(a);
ScrA.display( );
} else {
B.send(b);
ScrB.display( );
}
</script>
```

Example A illustrates the correct approach whereby the conditional navigation is embedded into the screen via a condition script. The script performing the screen transition and message send is gated by the current state of User.selection. Example B illustrates the less desirable approach whereby the conditional logic is evaluated within a single script. By using the approach of Example A, the Message-Origination pattern 652a may be more readily applied.

Script Patterns 652

MessageOrigination Pattern 652a

The MessageOrigination pattern 652a provides an intelligent means of generating script required to send a message of a message component 404. The pattern 652a applies some rules to determine where the content of the message should come from. Included in this pattern selection 652a are the issues of: you are developing a screen component 402 that will collect or manipulate some information and then send a message; how can you easily produce the script required to send the message; the screen component 402 has an associated data type for processing that may have been supplied as a parameter, constructed in the screen, or referenced as part of a collection. Example design parameters for consideration are: the ability to generate scripts for common usage scenarios can reduces the complexity of developing applications 105; and Message, screen, data definitions or respective components and their inter-relationships adhering to application 105 development best practices typically may be subject to a set of recognized processing rules. Based on the above, the pattern 652a could direct the developer (via the display 206 or other means of the user interface 202) to, by way of example only:

1. using the workflow/script editor 702,706 when developing a workflow component 406 that may branch conditionally to other screens (components 402), or send different messages, the conditional logic should be captured in the screen component 402 design rather than shifted to the workflow component 406 (observe the Make Screen Controls Conditional 656d approach), such that the effect of using this approach is that there need not be conditional logic embedded into the script generated by the MessageOrigination pattern 652a;

2. as part of definition of a button or menu item, the user may attach a script to do custom processing. One typical processing is to send a message, and transition to another screen
  a. the user is prompted if the script is to send a message, and identifies the message type (M) to be sent,
    i. a subset of most likely messages to be sent can be extracted by observing mappings in use for data types that have been used in the screen definition of the component 402 (parameter or linked data),
    ii. any other message previously defined may be chosen,
  b. the user is prompted for the screen to which the application will transition;

3. the mappings rules for message type M are determined,
  a. mapping in place to one or more data types (message mapping or field mapping),
    i. the source of mapped data types must be indicated,
      I. may be a data parameter that was passed to the screen component 402,
      II. may be a data type linked to a control used elsewhere in the screen component 402,
      III. may be the base data type of a collection (e.g. Data),
      IV. may be the base data type of a collection type field on another data type (e.g. Data1.Data2),
    ii. a script is generated that sends a message using data identified,
    iii. a field mapped message generates a script of the component 406 that uses the data instances passed to the script to initialize the fields prior to sending,
    iv. a field mapped message that contains extended fields causes the tool 116 to prompt for values of these fields (may be from a screen control for instance, or just a literal value),
    v. the script that sends the message using specified data, and accepts appropriate parameters is generated. Message field sets are generated as required and the next screen is requested'
  b. There are no mappings for message type M,
    i. the tool 116 prompts the user to identify where each of the field values come from
      1. may be from other screen fields,
      2. may be simple literal values,
      3. may be ignored,
      ii. the tool 116 generates the script that accepts required parameters, sets the fields and sends the message, followed by transition to the next screen of the screen component 402,
  c. mapping in place but the mapped data type is not passed to or used within the screen,
    i. generates an error message, this message cannot be sent from this screen;

4. as an alternative to enforcing mappings for an existing message, the option to create a new message is offered
  a. initial definition of the message can be suggested based on fields that are currently used within the screen, or linked data types that may be candidates for message mappings; and 5. the workflow component 406 development is completed (either in whole or in part) and subsequent editors/viewers 600,602 are either invoked directly or though subsequent wizards 604.

MessageReception 652c

The MessageReception pattern 652c provides a means to utilize common processing at the reception of a message. Included in this pattern selection 652c are the issues of: how do you simplify the specification of effect of application 105 through script when a message is received; you are writing the application 105 that receives messages; the messages of interest contain field level mappings which indicates that additional processing through script of the workflow component 406 may be required. Example design parameters for consideration are: there are some common scenarios that may be applied to reception of a field level mapped message; and there are primary key field mappings in the message that do not update other mapped data fields. Based on the above, the pattern 652c could direct the developer (via the display 206 or other means of the user interface 202) to, by way of example only:

1. using the workflow/script editor 702,706 the message specification of a message M is analyzed,
  a. a message mapping in place indicates low likelihood of need for additional processing where there is no need for the tool 116 to prompt the developer to attach a script,
  b. Field mapping relationships in place indicate a greater likelihood for additional processing through script, particularly,
    i. a message that has primary key field mappings to data types that are not referenced on other message fields is an immediate trigger to prompt through the tool 116 the need for additional processing;

2. primary key field mappings are detected,
  a. in the case that there is one isolated primary key field mapping (i.e. create) the tool 116 may prompt the developer if it is desired to attach additional processing through the script, the created script of the workflow component 406 would be empty in this case,
  b. in the case that there are two or more such isolated mappings as indicated above:
    i. if one mapped data type is a nested field of the other data type: Data1.x, type of x is Data2,
      I. the tool 116 recommends to set the instance of Data2 onto Data2 field x.
      II. a script of the workflow component 406 is generated that performs the set operation
    ii. if one mapped data type is the base type of a nested collection on the other data type: Data1.x, type of x is Data2
      I. the tool 116 recommends that either an add, or remove may be performed, II. the developer chooses the preferred option and the associated script of the workflow component 406 is generated;
3. in the case that a field mapping is specified to a data type is that not correlated by a primary key mapping
   a. the tool 116 may prompt the developer if every instance in the collection of this data type should be updated with that field value,
      i. A subset of the entire collection may be specified via a where clause,
         I. tool 116 prompts for condition field of data type,
         II. tool 116 prompts for comparison operator,
         III. tool 116 prompts for comparison value,
            a. may be specified as coming from another field of the message that is not mapped; and
4. the workflow component 406 development is completed (either in whole or in part) and subsequent editors/viewers 600,602 are either invoked directly or though subsequent wizards 604.

Control Condition Pattern 652*b*

The Control Condition pattern 652*b* provides guidelines necessary to generate a condition affecting the display of a particular screen control though a script that could be contained in a workflow component 406. A Control Condition always evaluates to a boolean result. Included in this pattern selection 652*b* are the issues of: how do you specify that display of a screen control is dependent upon satisfying a set of conditions; how do you easily generate a script to implement this conditional behaviour; you are developing the application 105 that has branching or dynamic screen behaviour based on the current state of an element of data, the state of a screen control, or value in a passed parameter. Example design parameters for consideration are: the developer may have little scripting knowledge; and writing script is error prone. Based on the above, the pattern 652*b* could direct the developer (via the display 206 or other means of the user interface 202) to, by way of example only:

1. using the workflow/script editor 702,706 and or screen editors the developer is presented with a list of available
   a. Data collections,
   b. Current screen control names (edit boxes and list controls),
   c. Available parameters that were passed to the screen,
2. the developer chooses one of the available entities provided in 1.
   a. For collections,
      i. the developer may test that there is at least one element (size( )>0),
      ii. the developer may test that a particular field is contained,
         I. "contains field" text is displayed for collections,
         II. "field value is" is displayed for keyless (singleton) collections,
         III. the developer may enter the field name,
         IV. the developer may specify the field value,
            a. could be a literal (design time),
            b. could be a runtime value,
               i. field of data instance created or passed to the screen,
               ii. control field of current screen,
   b. for screen parameters,
      i. Parameter itself,
         I. developer may test if the instance is undefined (ie null),
      ii. single instance parameter fields,
         I. developer may test that single instance is undefined (ie null),
      II. developer may test that field of parameter has particular value (same as 2.a.ii.3 & 4),
      iii. array parameter fields,
         I. developer may test if there is at least one element (size( )>0),
         II. developer may test if a particular field is contained (same as 2.a.ii)
         Options for test are controlled by what type of element is selected,
   c. for screen control fields,
      i. for a selected edit or textarea control,
         I. developer may test if value is empty,
         II. developer may compare value to a literal which the developer enters,
         III. developer may test the value with a mask,
      ii. for a selected choice control,
         I. developer may test if the choice control is empty (true or false),
         II. developer may test if a particular index is selected,
         III. developer may compare to a literal which is provided,
         IV. developer may test the value with a mask;
3. the developer may combine another condition by selecting "more" and choosing the appropriate operator (e.g. AND/OR);
4. the developer may elect to edit the condition in script form if other advanced behaviour is required; and
5. the workflow component 406 development is completed (either in whole or in part) and subsequent editors/viewers 600,602 are either invoked directly or though subsequent wizards 604.

Messaging Patterns 658

NotificationBuilder Pattern 658*b*

Figure 16:
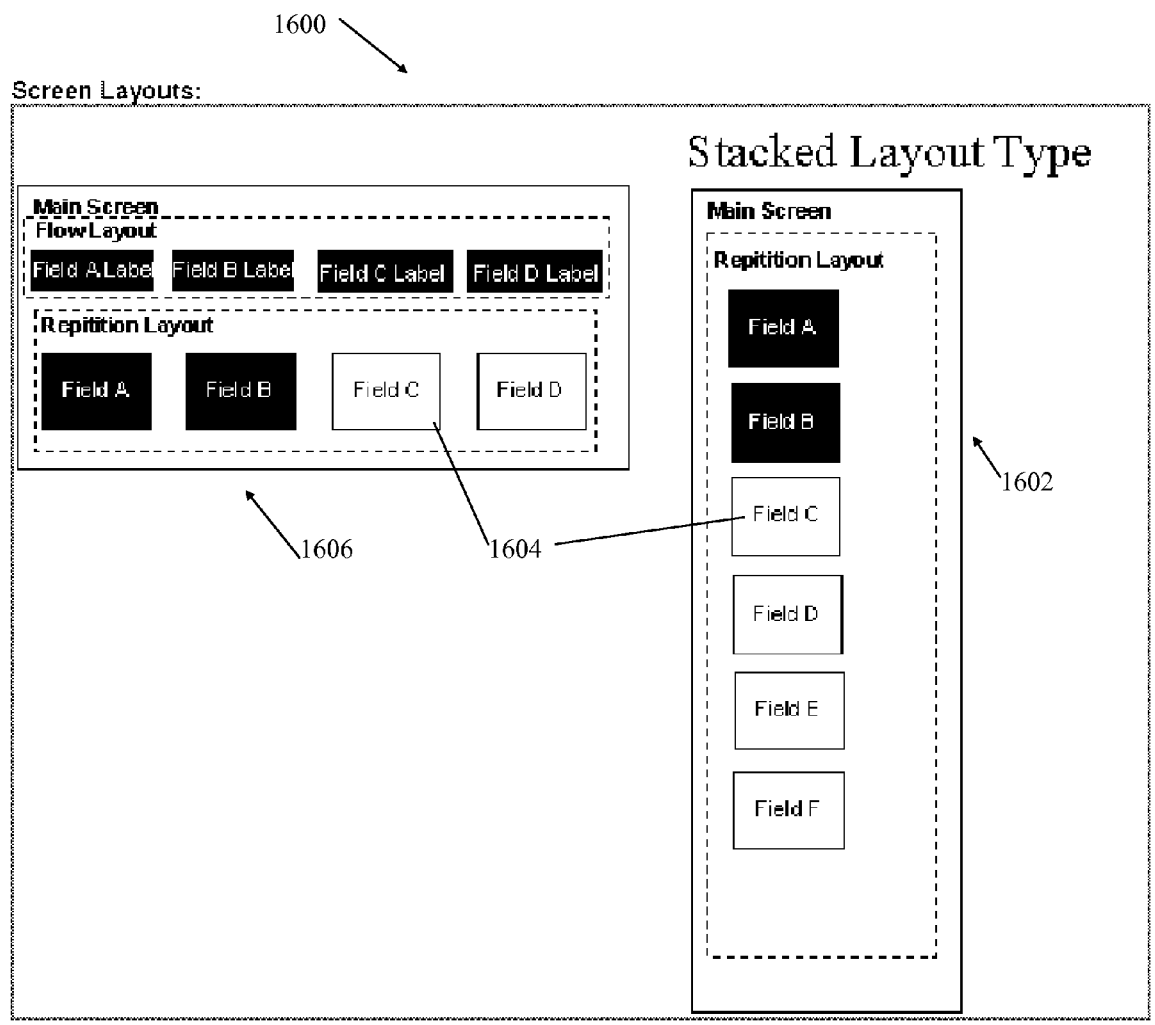
FIG. 16 is an example screen of a pattern of FIG. 13.

The NotificationBuilder pattern 658*b* provides a means to generate notification and subscription support from a notification datasource 106. Included in this pattern selection 652*c* are the issues of: how do you easily generate screens and messages to support a notification interface at the backend; how do you generate filters for screening of notifications; and you are working to a notification interface that is expressed through a WSDL file, as an example backend schema. Example design parameters for consideration are: notification Web Services are anticipated as becoming more widespread; notification interfaces and supporting subscription and filtering is a complex area; the developer must at least know the types of notifications supported by the datasource 106 through documentation or some other source and/or the pattern 658*b* cannot distinguish between complex types used for notifications and those that are exchanged as part of regular synchronous request/response. Based on the above, the pattern 658*b* could direct the developer (via the display 206 or other means of the user interface 202) to, by way of example only:

1. using the message editor 712 the developer points the tool 116 to the datasource WSDL (i.e. schema),
   a. the tool 116 presents a list of available complex types from the WSDL,
   b. the tool 116 presents a list of available operations from the WSDL,
   c. the developer can select from the presented notifications based on a-priori knowledge of the service being exposed;
2. the tool 116 asks the developer whether they want to receive alerts for certain notifications (building the notification criteria)
   a. the tool 116 asks the developer if they want to specify a separate critera (ie filter) for the alerts i. if no then the alerts will be a simple checkbox
ii. if yes then the alert will have a separate filter criteria;
3. the tool 116 collects the filter requirements for notifications and alerts as a set of filter parts
  a. the developer can select from a field of the notification complex type
  b. the developer can select a comparison operator
    i. ==, != for Strings,
    ii. ==, !=, >, <, >=, <= for Numbers,
    iii. Other types,
  c. the developer can select a comparator field
    i. another field of the notification (no widget) or a single literal value,
      I. the developer can indicate that this filter part is conditional,
        a. a checkbox is used to represent it at the screen,
    ii. a freeform entry field,
      I. an editbox is used to represent this filter part at the screen,
      II. The developer provides a text label,
    iii. an enumeration of values,
      I. a dropdown or radio button array is used to represent this filter part at the screen,
  d. the developer names the filter part (this is used for display purposes on the screen),
  e. The developer can indicate to add another filter part (boolean expression), joining with either && or || operator;
4. the tool 116 makes note of all referenced notification fields, the remaining fields are candidates for static notification criteria, i.e. information the user provides when setting up the notification
  a. the developer is asked if any of the remaining fields are to be combined as part of elemental filter criteria,
  b. if so, the additional filter parts are built using approach of step 3, whereby only edit boxes and dropdown fields are permitted for input (no conditional filter parts here) such that this criteria becomes a static criteria;
5. the tool 116 generates required components using appropriate editors 600 and viewers 602
  a. a data component 400 containing all the fields of the notification+an additional primary key field (id),
  b. Notification message components 404
    i. a subscribe message component 404 for each notification type supported,
    ii. An unsubscribe message component 404 for each notification type supported,
    iii. a notification message mapped to data notification component,
  c. alert message components 404 (if selected),
    i. an alert subscribe message component 404 for each notification type supported,
    ii. an alert unsubscribe message component 404 for each notification type supported,
    iii. an alert notification message component 404 with suitable alert tag,
  d. a mapping file containing a filter for each notification and alert
    i. filters containing conditional elements (ie dynamic filters) arising when filter parts are mapped to checkbox controls generate combinations of filters parts (only one such filter part supported for first phase, i.e. max 2 filters),
      I. the subscription message for notification or alert includes a boolean field to indicate whether this flag has been selected such that the application gateway AG applies the correct filter based on the state of the flag;
6. the tool 116 generates support screens (components 402)
  a. the tool 116 decides on notification basic layout 1600 best approach (see FIG. 16 described below),
    i. for greater than 4 visible notification information fields 1604, recommend a stacked (vertical) layout 1602 of fields 1604,
    ii. for less than 4 visible notification information fields 1604, recommend a line (flow) layout 1606 of fields,
  b. the developer indicates whether the user will
    i. view results and modify filters on the same page,
      I. advantage: less page traversals,
      II. disadvantage: focus visits every editable filter field,
      III. see Consolidated Screen discussion below with reference to FIG. 17,
    ii. view results and modify filters on a separate page,
      I. advantage: quick scrolling of notifications,
      II. disadvantage: have to go to another screen to edit filter,
      III. see SeparatedScreen discussion below with reference to FIG. 18,
  c. the developer may attach additional fields 1604 to the presentation that are not part of the notification filter criteria, but may be part of the notification result (i.e. mapped to the notification data type generated in 5.a.; and
7. the message component 404 development is completed (either in whole or in part) and subsequent editors/viewers 600,602 are either invoked directly or though subsequent wizards 604.

ConsolidatedScreen

Figure 17:
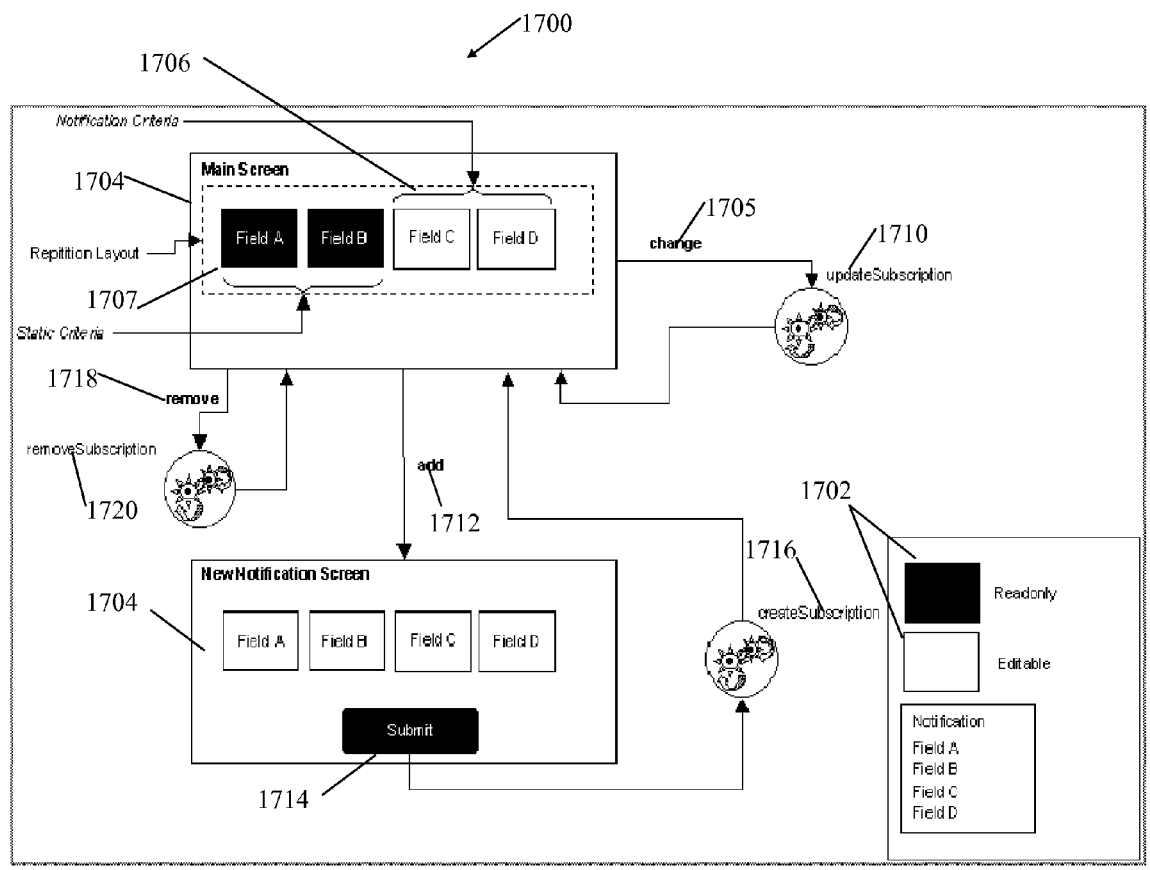
FIG. 17 is a further embodiment of the screen of FIG. 16.

For example, generated screens 1700 for the consolidated visualization of notification result and filter are shown in FIG. 17. The line layout is depicted here but is of no consequence to the behaviour of the screens. Black and white boxes 1702 are mapped to fields of the notification (fields A through D). Black boxes 1702 are considered readonly, whereas white boxes 1702 may be modified. The main screen displays static criteria 1707 as readonly. The user is able to modify notification and alert criteria 1706 which triggers a change action 1705 (this may not be a result of menuitem, rather default behaviour of changing a field). An updateSubscription script 1710 takes care of sending the appropriate notification and/or alert messages. The add 1712 menuitem transitions the user to the New Notification Screen 1704, where both the notification and alert filters and the static criteria 1707 of the subscription may be specified. A submit button 1714 calls a createSubscription script 1716 that sends the appropriate subscription messages. Finally a remove 1718 menuitem runs a script 1720 that removes the current notification and related subscription.

Figure 18:
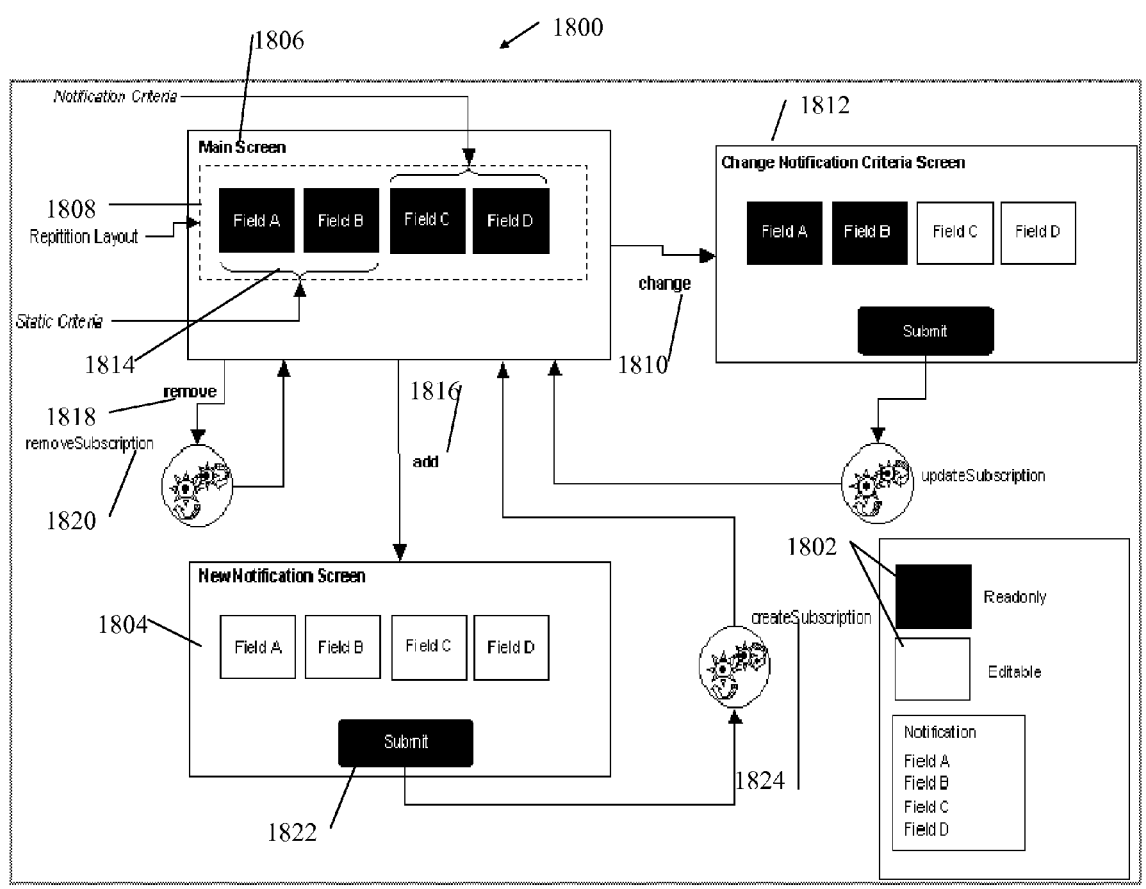
FIG. 18 is a further embodiment of the screen of FIG. 16

SeparatedScreen:

The generated screens 1800 for separate result and filter modification screens are depicted in FIG. 18. The line layout is depicted here but is of no consequence to the behaviour of the screens. Black and white boxes 1802 are mapped to fields of the notification (fields A through D). Black boxes 1802 are considered readonly, whereas white boxes 1802 may be modified. A main screen 1806 displays all notification results previously setup in a repetition layout 1808. There is no ability to modify the filter from this screen 1806. A change 1810 menuitem transitions the user to a screen 1812 where a single notification is displayed. A static criteria 1814 is not modified at this screen 1812, but the notification fields may be updated to generate a resubscription. An updateSubscription script 1814 would take care of sending the appropriate subscription messages including if both alert and notification filters are modified. An add 1818 menuitem transitions the user to the screen 1814 where both the notification and alert filters and the static criteria 1814 of the subscription may be specified. A submit button 1822 calls a createSubscription script 1824 that sends the appropriate subscription messages. Finally a remove 1818 menuitem runs a script 1820 that removes the current notification and related subscription.

EXAMPLE

The weather notification example from the "AG, RE, IDE Notifications" document will be used to illustrate this pattern 658*b*.
1. The developer points to the weather notification Web Service,
2. The developer chooses the notification complex object as notification object,
3. The developer indicates that they will be receiving both alerts and notifications,
  a. The developer indicates that the alert will not specify its own criteria, just allow it to be turned on and off: a checkbox is generated,
4. The tool 116 begins to build the notification criteria,
  a. The developer indicates field type from the notification,
  b. The developer indicates operator,
  c. The developer indicates comparison to an enumerated type of values "alert", "forecast", "report": a dropdown is generated,
  d. The developer names the filter part: Alert Type,
  e. The developer indicates to add another filter part with operator &&,
  f. The developer indicates field temperatureDiff from the notification,
  g. The developer indicates operator ==,
  h. The developer indicates comparison to an enumerated range of numerals 5, 10, 15, 20, 25, 30, 25, 40: a dropdown is generated,
  i. The developer names the filter part: Temperature Diff,
  j. The developer indicates to add a final filter part with operator &&,
  k. The developer indicates field weatherOriginal from the notification,
  l. The developer indicates operator !=,
  m. The developer indicates field weatherNew from the notification
    i. The tool asks the developer if this is to be a conditional field
    ii. The developer indicates yes: a checkbox is generated
  n. The developer names the filter part: Weather Changes
5. The tool 116 recognizes a set of notification fields that are not included in the notification criteria,
6. The developer indicates that there are additional fields that are to be included in the subscription. They are not dynamically changeable by the user, only specified when a new subscription is set up (static criteria),
7. The developer adds to the filter of part 4 by specifying a freeform entry box for each of the Location, County and State fields of the notification. The mechanism of part 4 is reapplied for logical operators: Editboxes are generated for each,
8. The tool 116 recommends a stacked layout based on the number of fields in static and notification criteria,
9. The developer chooses from the consolidated screen or separate screen approach for modifying notification criteria,
10. The tool 116 generates
  a. Required subscription messages for alerts+notifications,
    i. Generates a boolean flag indicating whether the Weather Changes checkbox is selected,
  b. Required mapping files including all filters,
    i. A separate filter for the Weather Changes filter part,
  c. Required unsubscription messages,
  d. Screens using the stacked layout,
    i. static criteria fields are labels in all but the add notification screen
    ii. notification criteria fields are editable in the add notification screen and change notification screen and main screen if using consolidated screens,
    iii. Labels provided for each filter part are attached to the corresponding editboxes, checkboxes or dropdowns.

MessageContentTarget Pattern 658*a*

This pattern 658*a* is used to determine what element is affected by a message. The target of a message is typically a screen 402 or data 400 component. Included in this pattern selection 658*a* are the issues of: with the definition of a message in hand, how do you specify the effect on the application of receiving a message; you are using the Bottom Up Approach pattern 650*a*, or defining your own set of messages; and you want to connect these messages to some element of the application 105 to specify how message reception affects application 105 behaviour. Example design parameters for consideration are: message reception affects the operation of the application 105 in some way; there is a set of standard effects that message reception can have. Based on the above, the pattern 658*a* could direct the developer (via the display 206 or other means of the user interface 202) to, by way of example only:
  1. using the message editor 712 with the message definition in hand, the developer may specify that a message:
    a. generates a data component 400 instance
    b. is linked to a screen template such that reception of the message updates the screen component 402 with new values and the message is immediately discarded; and
  2. the message component 404 development is completed (either in whole or in part) and subsequent editors/viewers 600,602 are either invoked directly or though subsequent wizards 604.

Example Elements 301

The following are example elements 301 for the deployable application 105 jar file that has been generated by the tool 116 for a Weather Web Service as an example of the datasource 106.

Weather.mapping

The text file entitled "11078430_3.txt" submitted as a computer program listing appendix on a compact disc defines example mappings 302 to be used by application gateway AG to tie application messaging over the network 10 with Web Service SOAP messages defined in WSDL. The information and/or data contained 11078430_3.txt is incorporated by reference in its entirety.

Weather.xml

The text file entitled "11078430_4.txt" submitted as a computer program listing appendix on a compact disc defines example XML definitions 300 (e.g. representing components 400,402,404) for inclusion in the deployable application 105 jar file (to be provisioned to the device 100). The information and/or data contained 11078430_4.txt is incorporated by reference in its entirety.

Weather.script

The following defines example application 105 workflow scripts (e.g. workflow component 406) which can augments the XML definitions 300 given above when provisioned to the device 100.

```
function script_inGetWeatherByZipSoapOut_onClose( ){scr_Main.display( );}
function script_Err_back( ){Screen.back( );}
function
inGetWeatherByZipSoapOut_onMsgArrive( ){scr_inGetWeatherByZipSoapOut.display( );
}
function
script_outGetWeatherByZipSoapIn_onSubmit( ){outGetWeatherByZipSoapIn.parameters
=Global.gv_GetWeatherByZip;
outGetWeatherByZipSoapIn.send( );
scr_Main.display( );}
function script_inGetWeatherByCityStateSoapOut_onClose( ){scr_Main.display( );}
function
inGetWeatherByCityStateSoapOut_onMsgArrive( ){scr_inGetWeatherByCityStateSoapOu
t.display( );}
function
script_outGetWeatherByCityStateSoapIn_onSubmit( ){outGetWeatherByCityStateSoapI
n.parameters=Global.gv_GetWeatherByCityState;
outGetWeatherByCityStateSoapIn.send( );
scr_Main.display( );}
function script_inGetWeatherByIPSoapOut_onClose( ){scr_Main.display( );}
function
inGetWeatherByIPSoapOut_onMsgArrive( ){scr_inGetWeatherByIPSoapOut.display( );}
function
script_outGetWeatherByIPSoapIn_onSubmit( ){outGetWeatherByIPSoapIn.parameters=G
lobal.gv_GetWeatherByIP;
outGetWeatherByIPSoapIn.send( );
scr_Main.display( );}
function
script_inGetWeatherHistoricalByZipSoapOut_onClose( ){scr_Main.display( );}
function
inGetWeatherHistoricalByZipSoapOut_onMsgArrive( ){scr_inGetWeatherHistoricalByZ
ipSoapOut.display( );}
function
script_outGetWeatherHistoricalByZipSoapIn_onSubmit( ){outGetWeatherHistoricalBy
ZipSoapIn.parameters=Global.gv_GetWeatherHistoricalByZip;
outGetWeatherHistoricalByZipSoapIn.send( );
scr_Main.display( );}
function script_inGetWeatherByWMOIDSoapOut_onClose( ){scr_Main.display( );}
function
inGetWeatherByWMOIDSoapOut_onMsgArrive( ){scr_inGetWeatherByWMOIDSoapOut.displa
y( );}
function
script_outGetWeatherByWMOIDSoapIn_onSubmit( ){outGetWeatherByWMOIDSoapIn.parame
ters=Global.gv_GetWeatherByWMOID;
outGetWeatherByWMOIDSoapIn.send( );
scr_Main.display( );}
function script_inGetWMOIDByCitySoapOut_onClose( ){scr_Main.display( );}
function script_WMOID_back( ){Screen.back( );}
function
inGetWMOIDByCitySoapOut_onMsgArrive( ){scr_inGetWMOIDByCitySoapOut.display( );}
function
script_outGetWMOIDByCitySoapIn_onSubmit( ){outGetWMOIDByCitySoapIn.parameters=G
lobal.gv_GetWMOIDByCity;
outGetWMOIDByCitySoapIn.send( );
scr_Main.display( );}
```

1_0.dtd (DTD (Document Type Definition)

The text file entitled "11078430_5.txt" submitted as a computer program listing appendix on a compact disc defines an example document structure for the applications 105. The information and/or data contained 11078430_5.txt is incorporated by reference in its entirety.

Although the disclosure herein has been drawn to one or more exemplary systems and methods, many variations will be apparent to those knowledgeable in the field, including substitution of other appropriate editors 600 and viewers 602 than those used for exemplary purposes in the description of the patterns 648, and such variations are within the scope of the application. Further, it is recognised that the user interface 202 and the display 206 could be defined together as the user interface of the tool 116. Although XML and a subset of ECMAScript are used in the examples provided, other languages and language variants may be used to define component applications. The proposed E4X standard scripting languages could be used in place of ECMAScript, for example. Further, other structured definition languages, than XML described above, can include such as but not limited to Resource Description Framework (RDF), XSLT, and XHTML.

The embodiments of the invention in which an exclusive property or privilege is claimed are defined as the follows:

1. A method of developing a client application including application components comprising one or more of a data component, a message component, a screen component, and a workflow component, the data component, the message component and the screen component having corresponding component definitions, the workflow component comprising a series of instructions, the method comprising:
   interacting with a development environment provided by a user interface;
   selecting a first pattern from a plurality of patterns based on an application component type central to the client application;

providing guidance on the user interface through the first pattern with a plurality of predefined steps in accordance with the first pattern to coordinate the development of a application components through user input events via the user interface;
selecting a first module corresponding to application component types associated with the first pattern; and
developing by the first module definitions of at least one of the application components through interaction with a data model of a development environment providing a persistent state of the application components, the operation of the first module being coordinated using the plurality of the predefined steps;
wherein the developed definitions of the application components are subsequently coded and assembled as the client application;
wherein the first pattern is selected from the group consisting of: a pattern for generating a suitable application based on an available backend data source messaging description; a pattern for developing the suitable application based on an available backend data source messaging description such that the entire application is developed including data components and screen components; a pattern for developing the application based on an existing database schema; a pattern for developing a standard set of data components that model a particular business domain for the application, a screen pattern for coordinating the development of a screen component as the first component; a message pattern for coordinating a development of a message component as the first component; and a script pattern for coordinating a development of a workflow component as a second component.

2. The method according to claim 1, further comprising:
selecting a second pattern for guiding a user of the user interface with a portion of the plurality of predefined steps to coordinate the development of the application components through user input events via the user interface, the second pattern chosen from the plurality of patterns based on a further application component type central to the client application.

3. The method according to claim 2, further comprising:
selecting directly the first module by the first pattern as a primary pattern.

4. The method according to claim 2, further comprising:
selecting indirectly the module through cooperation with the second pattern as a secondary pattern.

5. The method according to claim 2, wherein the second pattern is selected from the group consisting of: a screen pattern for coordinating a development of a screen component as the first component; a message pattern for coordinating a development of a message component as the first component; and a script pattern for coordinating a development of a workflow component as the second component.

6. The method according to claim 2, further comprising:
guiding a developer by a third pattern in selection of the first pattern being best suited to the current application development activity, the first pattern selected from the group consisting of: a pattern for generating the suitable application based on an available backend datasource messaging description, a pattern for developing the suitable application based on an available backend datasource messaging description such that the entire application is developed including data components and screen components; a pattern for developing the application based on an existing database schema; and a pattern for developing a standard set of data components that model a particular business domain for the application.

7. The method according to claim 3, further comprising:
returning by the second pattern as a secondary pattern, coordination of the development of the application components to the first pattern as a primary pattern.

8. The method according to claim 7, wherein the primary pattern employs the plurality of predefined steps, further comprising:
selecting a second module corresponding to the selected component type different from that of the first module.

9. The method according to claim 7, wherein the secondary pattern returns the coordination of the development of the application components to another primary pattern different to the primary pattern.

10. The method according to claim 5, wherein a data component as the first component is developed, further comprising:
applying the second pattern selected from the group consisting of: a screen pattern and a message pattern.

11. The method according to claim 10, further comprising:
generating a command by the first module for accessing and changing the state of the data model.

12. The method according to claim 11, further comprising:
affecting the first module by an event notification from the data model in response to the command.

13. The method according to claim 1, wherein a data component as the first component is developed, further comprising:
applying a first pattern selected from the group consisting of: a screen pattern and a message pattern.

14. The method according to claim 1, wherein the first module is selected from the group consisting of: editors and viewers.

15. The method according to claim 14, wherein the first module is selected from the group consisting of: a screen module; a data module; a message module; a workflow module; a message and data relationship module; a backend visualizer module; a localization module; a script editor module; a testing module, a data and screen relationship module; and a navigation module.

16. The method according to claim 1, wherein the second pattern is a validator pattern for confirming the data model representation of application messages is consistent with the datasource presentation of messaging operations.

17. The method according to claim 16, wherein the validator pattern coordinates the operation of the module as a validator module having functionality selected from the group consisting of: workflow integrity of a workflow component; consistency of parameters and field level mappings of the components; consistency of screen control mappings of a screen component; consistency of screen refresh messages of a screen component; confirming a presence of message duplications in a message component; confirming a presence of data duplications in components; and validating a data model representation of datasource messaging relationships.

18. The method according to claim 1, wherein the components are selected from the group consisting of: data components for defining data entities used by the application; screen components for defining the appearance and behavior of the application as displayed on the computing device; message components for defining a format of messages used by the application to communicate with the datasource; and workflow components for defining application processing that occurs when an action is to be performed.

19. The method according to claim 1, wherein the data model comprises model constituents selected from the group consisting of: data component definitions; global variable definitions; message component definitions; resource definitions; screen component definitions; scripts; style definitions; and mapping descriptors of the data source.

* * * * *